United States Patent
Greenwell et al.

[11] Patent Number: 5,134,601
[45] Date of Patent: Jul. 28, 1992

[54] OPTICAL DISK SECTOR SERVO PATTERNS

[75] Inventors: David W. Greenwell, Essex Junction, Vt.; Munro K. Haynes, Tucson, Ariz.

[73] Assignee: International Business Machines Corporation, Armonk, N.Y.

[21] Appl. No.: 392,035

[22] Filed: Aug. 8, 1989

[51] Int. Cl.[5] ............................................. G11B 7/00
[52] U.S. Cl. ................................ 369/44.26; 369/275.3
[58] Field of Search ........................ 360/77.03, 77.08; 369/14, 32, 44.26, 44.28, 94, 95, 111, 275.3, 275.4

[56] References Cited

U.S. PATENT DOCUMENTS

| | | | |
|---|---|---|---|
| 3,919,697 | 11/1975 | Walker | 360/77.08 |
| 4,161,752 | 7/1979 | Basilico | 369/275.3 |
| 4,578,788 | 3/1986 | Ahn et al. | 369/111 |
| 4,669,404 | 5/1987 | Moon et al. | 360/77.08 |
| 4,688,119 | 8/1987 | Blessum | 360/77.08 |
| 4,712,204 | 12/1987 | Takemura et al. | 369/32 |

FOREIGN PATENT DOCUMENTS

| | | | |
|---|---|---|---|
| 0177737 | 4/1986 | European Pat. Off. | 369/44.26 |
| 2612328 | 9/1988 | France | 369/44.26 |

Primary Examiner—Donald McElheny, Jr.
Attorney, Agent, or Firm—Whitham & Marhoefer

[57] ABSTRACT

Easily-fabricated, high track density, size-tolerant and efficient sector servo patterns are provided for optical disks. Easily-fabricated and efficient codes are provided for use with sector tracking optical disk servo systems. Marks larger than the spot size are used to avoid resolution problems and the limits of photolithographic processes. Independence from line-width variations is achieved by balancing. The features used for servo information are in every case in the form of pits or depressions in the substrate surface, such as could be produced by exposing a photoresist through a mask, followed by etching. The servo detectors sense the changes in reflectance from the disk owing to the cancellation of light waves from the two differing depths. The optimum depth is one-quarter wavelength in the substrate, so that the contributions from the two depths will be exactly out of phase. This produces maximum signal, but it also means that no data can be expected to be written or read in the servo sectors. When the spot is far away from a depression, or is completely inside a large depression, the disk reflectance is at its normal maximum value. When the spot is exactly centered on the edge of a large depression, the reflectance is very close to zero, depending on the exact difference in depths.

30 Claims, 29 Drawing Sheets

OPTICAL DISK SECTOR SERVO PATTERNS

BACKGROUND OF THE INVENTION

1. Field of the Invention

The present invention generally relates to optical disk storage devices and, more particularly, to track following and gray-code seek patterns for sector servos on optical disks.

2. Description of the Prior Art

Optical disks achieve high a real density of information storage by using optical methods of track-following to get high track densities. This requires some method of incorporating servo information on the disk, in the manufacturing process, for the track-following servo to sense and follow. A variety of techniques can be used, such as etching of the substrate or a photopolymer process, to generate structures of varying depths that can carry servo information. Commonly used servos employ grooves, which act as diffraction gratings, as the servo structure. The width of the groove, plus the width of the intervening land, is then equal to the track pitch. Photolithiographic processes could be used to define the groove structures, but the capability of those processes to generate either fine grooves or fine spaces between them is a severe limitation on attainable track densities. An alternate approach, called biplanar, uses both the groove and the land at widths equal to the track pitch. This somewhat alleviates the problem, but it is only a partial solution and introduces other problems. What is needed is a method of serving, wherein the features (and the spaces between) used for servo information can be larger than the track pitch. The larger they can be made, the greater the potential reduction in track pitch that can be achieved using photolithographic reproduction. This is important as shorter wavelength lasers become available in the future.

When a track-seek operation is performed on an optical disk, it is highly desirable to be able to identify with considerable accuracy the exact location of the spot relative to the numbered tracks. There are two specific uses for this information; one is to enable accurate determination of the velocity of the head motion, and the second is to be able to monitor the approach to the desired track, adjust the velocity accordingly, and land on the desired track with a minimum of elapsed time and without error. When servo grooves are used to seek on disks, it is common practice to count the grooves as they are passed. When sector servos are used, however, tracks can be crossed between occurrences of sector-servo information. Although the sector-servo data allows the determination of spot location within the tracking-servo period, which can be three or four tracks, that resolution might not be adequate when very high speed seek motions are possible. For this reason, it is desirable to insert additional, radially coded patterns that will provide exact determination of spot position over a wider range of track numbers. Note that there is no need to encode a unique identifier for each track on the disk. Identification within a range of 30 to 50 tracks is adequate, as the range of uncertainty will not be greater. Encoding to obtain more resolution than is needed is wasteful as area used for codes cannot be used for data storage. Efficiency of disk space utilization, as in the design of the sector tracking servo patterns, is an essential requirement.

Because the useful data is written on top of the grooves, these are a significant source of noise that contributes to the data error rate and is a limitation of a real density and data rate. The required bandwidth of the tracking servos is fairly low. A full time servo signal is not required for accurate track following; therefore, a sectored servo method, which inserts servo information in a number of discrete locations in sectors around the track, is feasible. The sector-servo technique is quite well known in conventional magnetic disk recording. In known optical disk sector servo systems, the marks comprising the servo data have been made with feature widths and spacings approximately equal to the track pitch, arranged in several rows radially, to achieve a two-phase pattern. A first problem with this approach is the limited track pitch that can be achieved with photolithographic methods. While this might not be a problem with read-only optical disks that are fabricated by plastic molding from masters that can be made with short wavelength lasers, it is still a severe problem when molded grooves are not acceptable. A second problem with using small feature dimensions and separations, comparable to the reading laser spot diameter, is the poor optical resolution that is obtained. The signal outputs are therefore extremely variable relative to spot size and to the inevitable variations in feature sizes and separations caused by variability of the fabrication processes. The poor resolution also results in low signal amplitudes and sensitivity to noise interferences.

SUMMARY OF THE INVENTION

It is therefore an object of the present invention to provide easily fabricated, high track density, size tolerant and efficient sector servo patterns for optical disks.

It is another object of the invention to provide easily fabricated and efficient track-position codes for use with sector tracking optical disk servo systems.

According to the invention, marks larger than the spot size are used to avoid resolution problems and the limits of photolithographic processes. Independence from line-width variations is achieved by balancing. In the description of the preferred embodiments, the features used for servo information are in the form of pits or depressions in the substrate surface, such as could be produced by exposing a photoresist through a mask, followed by etching. It will be understood, however, that these features could be in the form of mounds or raised surfaces, and the two should be considered equivalents. The servo detectors sense the changes in reflectance from the disk owing to the interference between light waves from the two differing depths. The optimum depth is one-quarter wavelength in the substrate, so that the contributions from the two depths will be exactly out of phase. This produces maximum signal, but it also means that no data can be expected to be written or read in the servo sectors. When the spot is far away from a depression, or is completely inside a large depression, the disk reflectance is at its normal maximum value. When the spot is exactly centered on the edge of a large depression, the reflectance is very close to zero, depending on the exact difference in depths.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF PREFERRED EMBODIMENTS OF THE INVENTION

Figure 1:
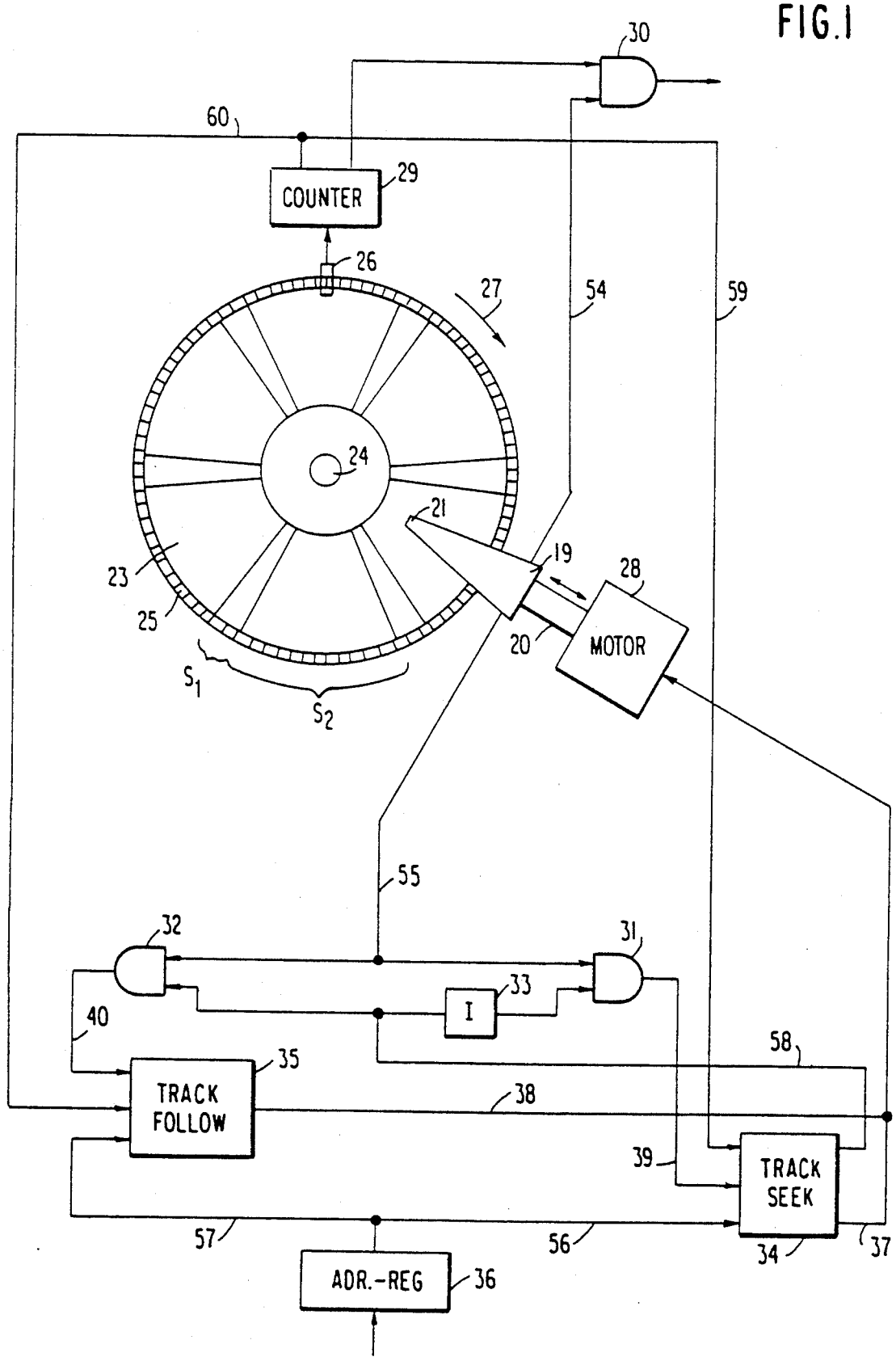
FIG. 1 is a high level block diagram showing a head positioning servo system for seeking and following a recording track on an optical disk.

Referring now to the drawings, and more particularly FIG. 1, there is shown a block diagram of a seek and track servo system for positioning an optical head 21 over an addressed recording track on an optical disk 23. The surface of the disk 23 is divided into servo sectors $S_1$ and data sectors $S_2$. The disk itself is connected to a driving spindle 24 so that by a driving motor (not shown) it can be rotated in the direction of arrow 27. Recording tracks concentrically provided on the surface of disk 23 are sensed by head 21 which is supported at the tip of carrier 19. By means of positioning movements of access arm 20 which, by access motor 28, is selectively positionable in a radial direction of the disk, head 21 can be positioned to a selected recording track on the surface of the disk 23. After the positioning of head 21 to a selected track, address sensing of a concentric recording track is performed. A marking track 25 synchronized with the rotation of the disk is sensed by a sensor 26 and applied to a counter 29. The clock signals sensed at marking track 25 can be used for controlling the signals transferred by the head 21 in such a manner that, depending on the rotation angle of the disk, servo signals associated with servo sectors $S_1$ are transferred to line 55 and data signals associated with data sectors $S_2$ are transferred to line 54.

By means of the servo system, head 21 approaches an addressed recording track by means of a movement of access arm 20. In the approach zone of the recording track, head 21 senses the servo markings in servo sectors $S_1$. Detection of the track address is applied to track seeking circuit 34 via line 55, AND gate 31 of input line 39. Address register 36 supplies the addressed track to circuit 34 via line 56. Furthermore, clock signals from the output of counter 29 are applied to circuit 34 via line 59. The transfer of the seek servo signals from head 21 via AND gate 31 to track seek circuit 34 is carried out by means of an output signal of the track seek circuit which, via line 58 and inverter 33, is transferred to an input of AND gate 31. This signal indicates that at the end of its access movement, head 21 has not yet found the track address so that, via output line 37 of track seek circuit 34, a seek signal is transferred to access motor 28 which effects radial positioning of the head 21 until track seek circuit 34 detects the marking pattern associated with the track address and sensed at the servo sector, and a respective detection signal is derived at line 58 of the track seek circuit 34. This detection signal interrupts the transfer of servo signals by AND gate 31 and effects an input signal at AND gate 32, so that servo signals transferred by line 55 are applied as track following servo signals to an input line 40 of track following circuit 35.

The track following circuit 35 receives via input line 57 from address register 36 a signal for the track address, and via line 60 an output signal of counter 29 which, by means of clock signals, determines switch times of the servo markings sensed at servo sectors $S_1$ of the disk. Track following circuit 35 detects track deviations of head 21 from the center of a track address, transferring track following servo signals to access motor 28 which, through radial driving movements, effects changes of position of head 21 for its positioning on the center of the recording track.

Figure 2:
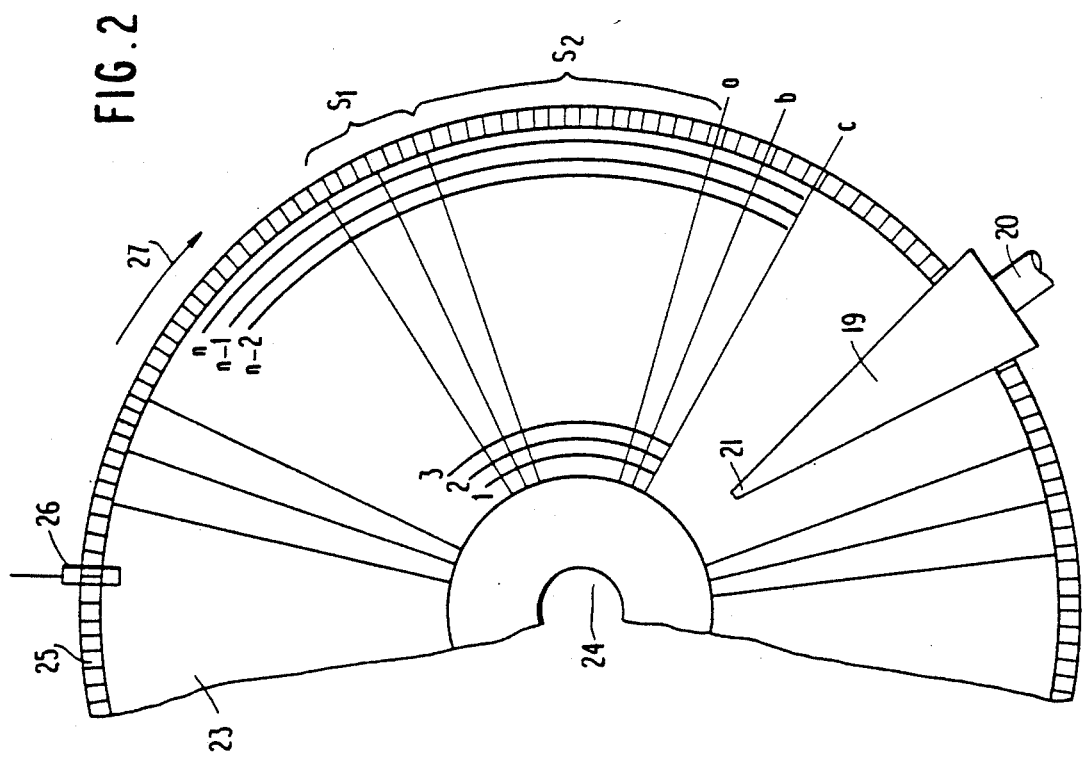
FIG. 2 is an enlarged view of a portion of the optical disk in FIG. 1 showing in more detail the arrangement of servo and data sectors.

FIG. 2 shows an enlarged representation of disk 23 with the elements which have already been explained in connection with FIG. 1. On the surface of the disk 23, there are concentric recording tracks with addresses 1, 2, 3, ..., n−1, n are associated. These recording tracks are subdivided into the already mentioned servo sectors $S_1$ and data sectors $S_2$. Radial lines a, b, c, designate the center lines of marking areas of the servo sectors $S_1$ where in radial direction, one behind the other, servo markings are recorded.

Figure 3:
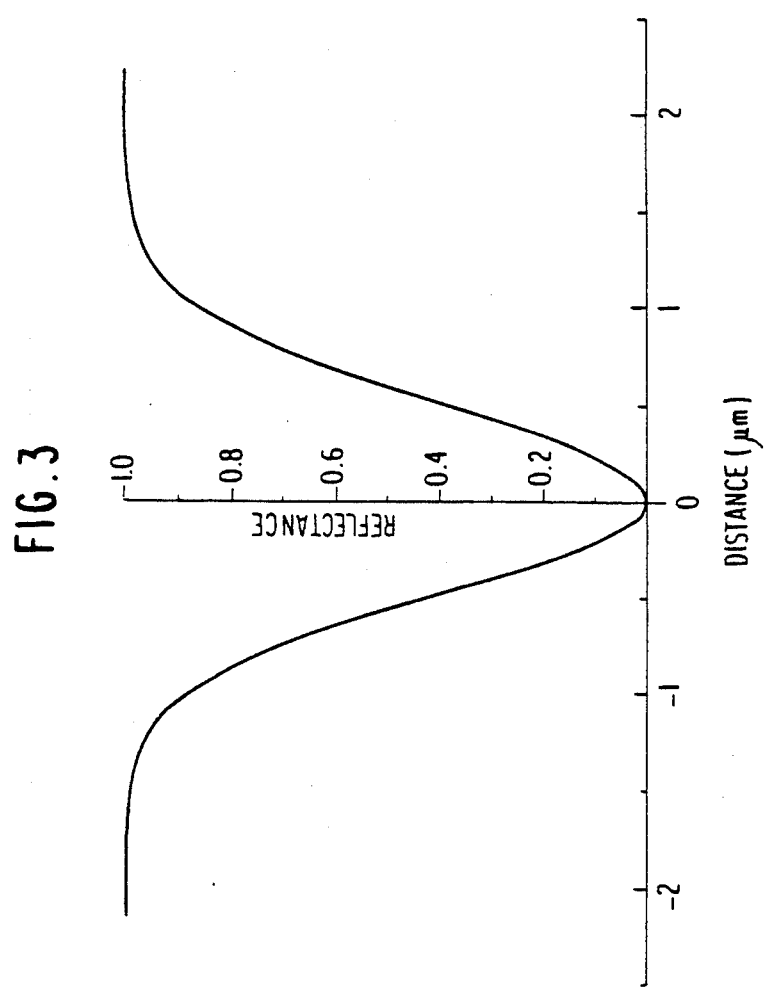
FIG. 3 is a graph showing reflectance from a semi-infinite step as a function of distance from the edge of the step.

In the following discussion, a Gaussian read laser spot diameter of 0.9 micrometer and a track pitch of 1.5 micrometers is assumed. The laser spot diameter is defined as the full width at half maximum (FWHM), meaning the width of the Gaussian spot at the point where the intensity is 50% of the maximum value. Scaling to differing spot sizes and track pitches will usually be obvious. Referring now to the drawings, and more particularly to FIG. 3, there is shown a graph of the calculated variation of the reflectance versus the distance of the spot center from a semi-infinite edge. For a 0.9 $\mu$m spot, the spot must be 1.5 $\mu$m or more away from a single infinite edge for the effect on the reflectance to be small enough to be neglected. This illustrates the poor resolution previously referred to. From FIG. 3, it can be seen that reflectance is a useful measure of the distance from a depression edge over a range of distances from about 0.2 to about 1 $\mu$m on either side of the depression. The slope, however, is not constant and reaches its maximum at 0.5 $\mu$m on either side.

A servo pattern is designed by arranging the size and shapes of the depressions in several radial rows so that the track error signal (TES) can be found by comparing distances to edges in one row with distances to edges in some other row. With three rows, a three-phase servo pattern can be generated, and with four rows, a four-phase servo. (As will be shown, it is also possible to make a four-phase system with three rows, with added constraints.) The reflectance in the center of each row is sensed, and to be insensitive to that placement, it is assumed that the widths of the depressions in each row are at least 3 $\mu$m so that the spot is always at least 1.5 $\mu$m from the sides of the rows when the reflectance and the distance are measured. Because the size of the depressions varies with material and process variations and the positions of the edges vary likewise, compensation is made by comparing the distance to an edge in one row from outside the depression with the distance to an edge in another row also from outside the depression, or comparing distances both from inside their respective depressions. In this way, the size variations will cancel, and the servo system will function correctly independent of those variations. However, it is also possible to use distances from the outside or from the inside or both, but always in like pairs, as explained above, to insure size independence.

Figure 4:
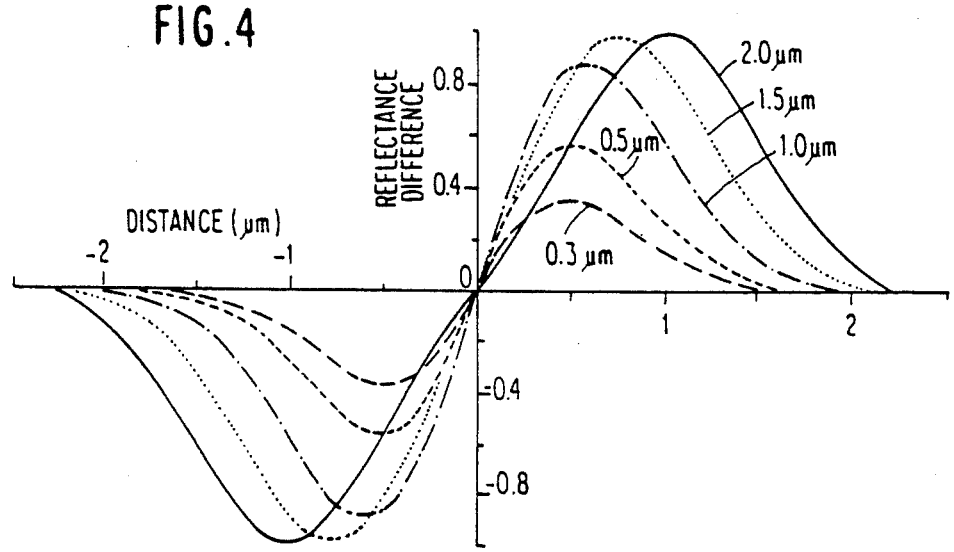
FIG. 4 is a graph showing reflectance difference function formed by subtracting the reflectance off one edge from the reflectance off a subsequent edge, where the abscissa is the distance from the centerline between edges and the successive curves are for different edge separations.
Figure 5:
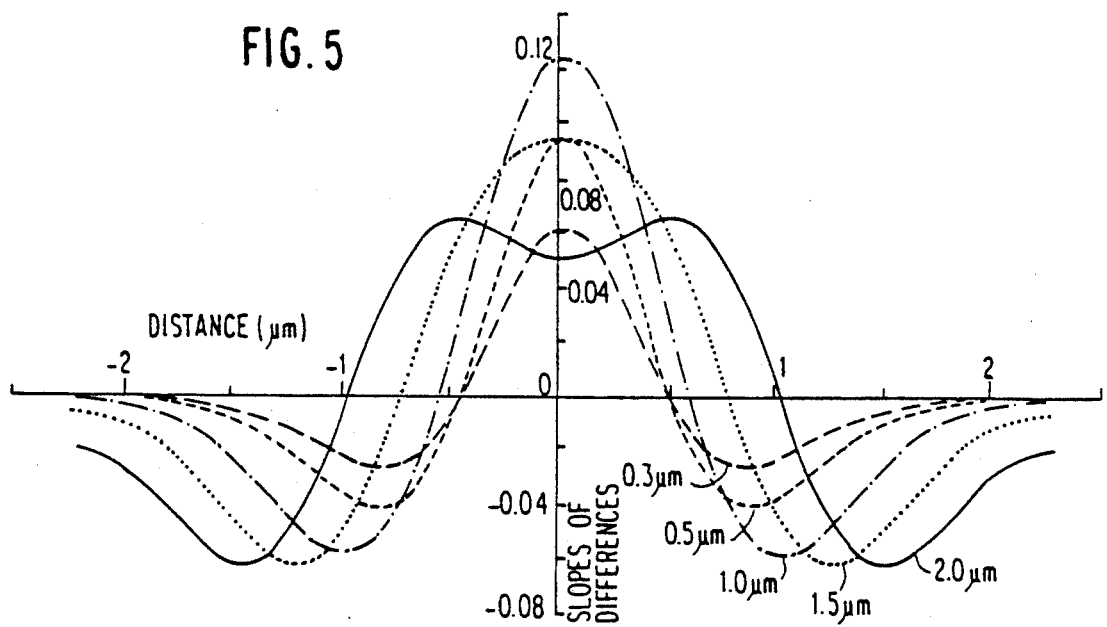
FIG. 5 is a graph showing the derivative for the curves of FIG. 2 as a function of the distance from the centerline between the two edges.

Having established that distances between pairs of features in two different rows are always compared, we now look at the difference between the reflectance from one edge and the reflectance from a second edge in a second row as a function of the offset or separation between them. This is shown in FIG. 4 for several values of separation: 0.3, 0.5, 1.0, 1.5, and 2.0 $\mu$m. As can be seen, there is an optimal range for the separation. FIG. 5, showing the slopes of the differences for the same separation values, further illustrates this. At separations less than 1.0 $\mu$m, both the difference amplitude and the slope decrease. At separations greater than 1.4 $\mu$m, the slope is no longer a maximum at the point equidistant from the two edges. For purposes of illustration, a separation distance of 1.5 $\mu$m is assumed, but other separation values are considered later.

Figure 6:
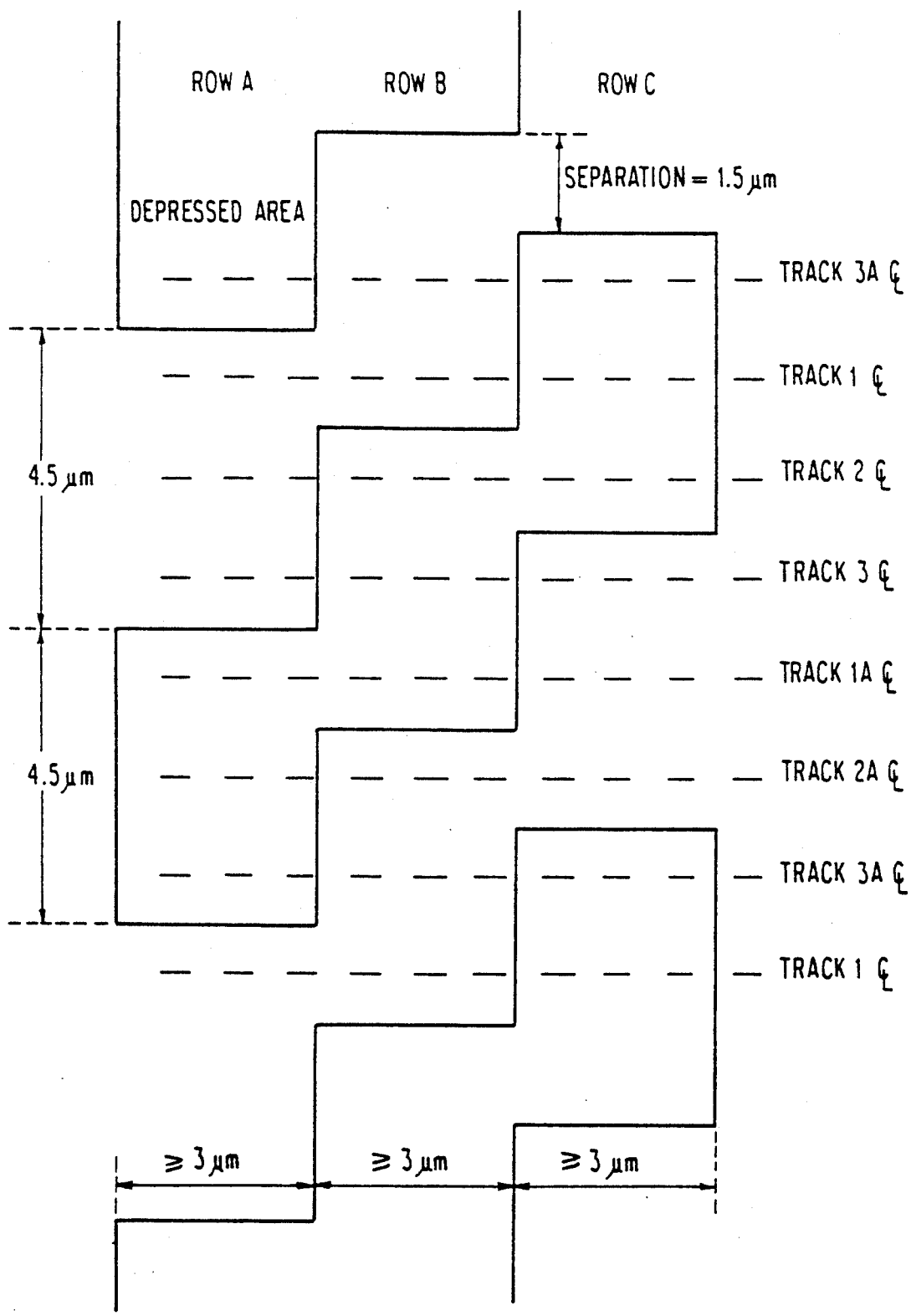
FIG. 6 is a simple servo pattern with large depressions for a three-phase servo for the case of alternate inside and outside pairs.

A simple servo pattern with large depressions is shown in FIG. 6. This is a three-phase system with three rows A, B and C. The minimum width, as previously mentioned, is 3 $\mu$m. The length along the row is 4.5 $\mu$m, the spacing in a row is 4.5 $\mu$m, and the pattern repeats on a 9 $\mu$m period. Rows B and C are offset from row A and from each other by 3 $\mu$m, and the relevant separation between pairs of edges being compared is always 1.5 $\mu$m. When following track 1, the difference in reflectance at the center of rows A and B is sensed from outside both depressions. On track 2, rows B and C, both inside, are used. On track 3, rows C and A, both outside, are used. On track 1A, rows A and B, both inside, are used. On track 2A, rows B and C, both outside, are used. On track 3A, rows C and A, both inside, are used. Thus, progressing from track to track, pairs of rows are switched so as to always use the nearest pair of edges, which are always of the same type, inside and outside, with a 1.5 $\mu$m separation. Note that no separation is shown between rows A, B and C. While such extra separation can be inserted, it is not needed and would only increase the loss of useful data storage area.

The depressions in the rows are therefore shown as intersecting in zig-zag groups.

Figure 7:
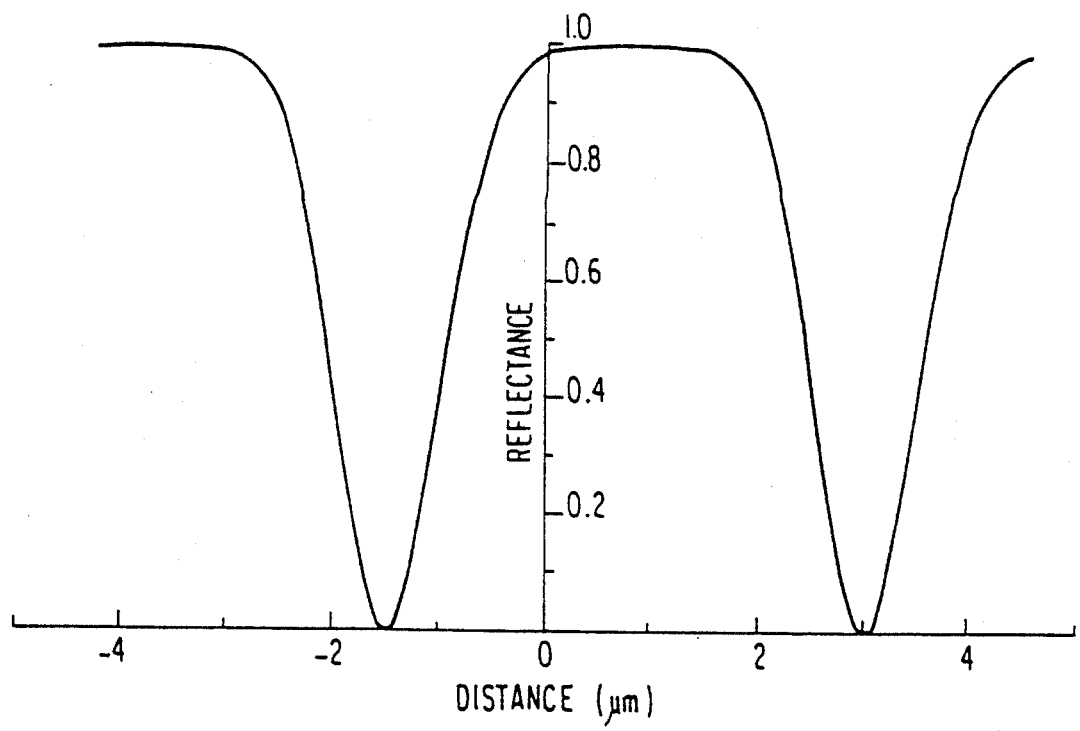
FIG. 7 is a graph showing the reflectance obtained at the center of a scan through row A as a function of the radius of the scan.
Figure 8:
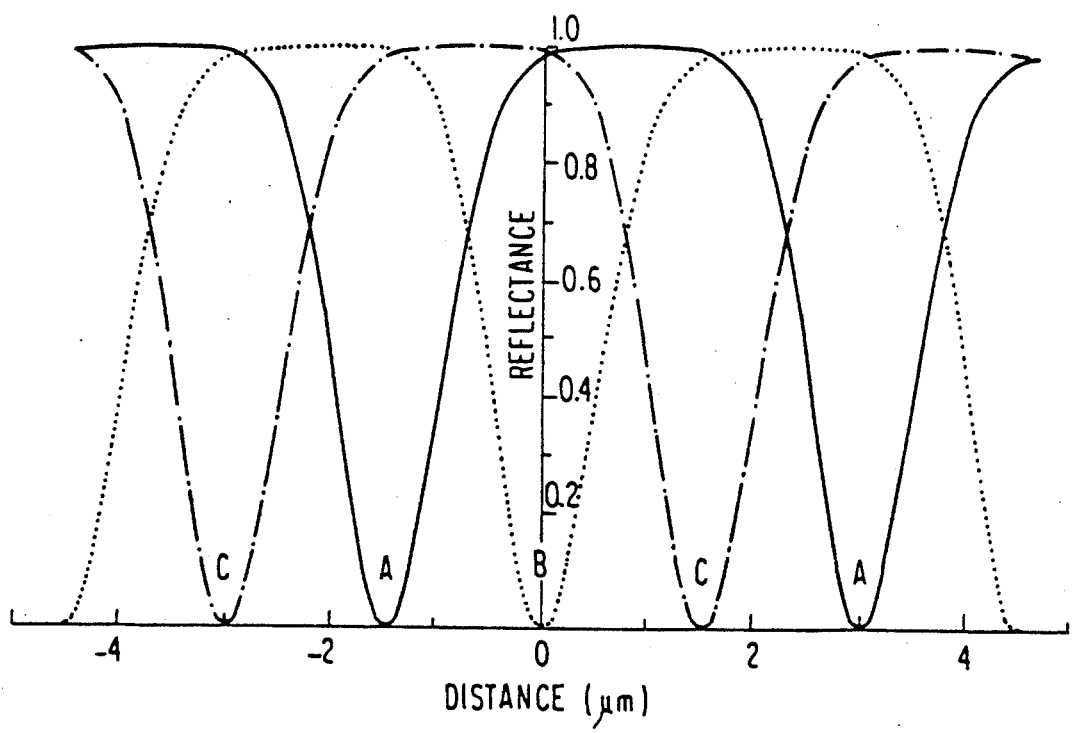
FIG. 8 is a graph showing the reflectance obtained at the center of a scan through rows A, B and C, respectively, for a three-phase servo that alternates between inside and outside edge pairs.
Figure 9:
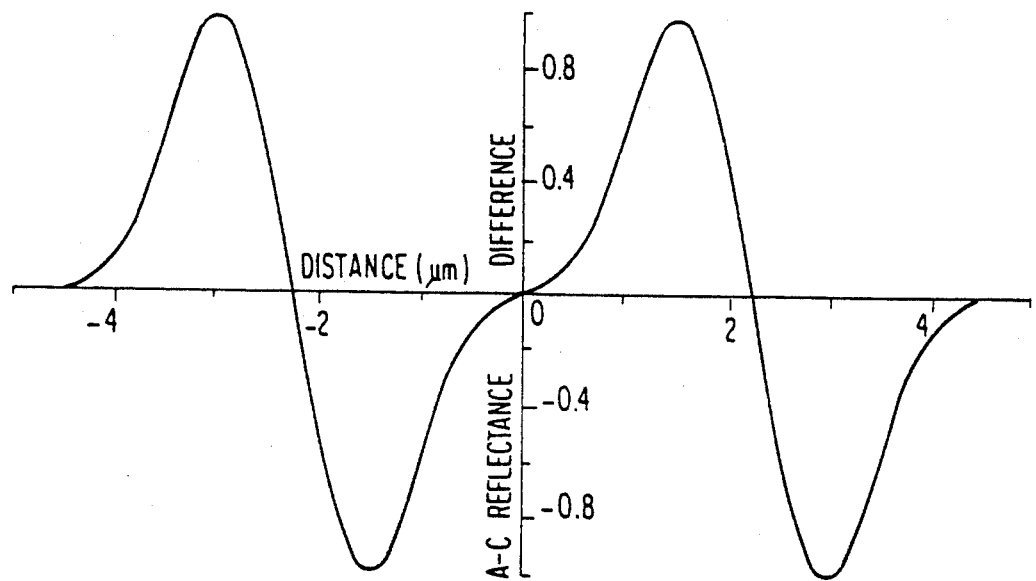
FIG. 9 is a graph of the reflectance difference A-C, which forms one track error signal for the three phase system that alternates between inside and outside edge pairs.
Figure 10:
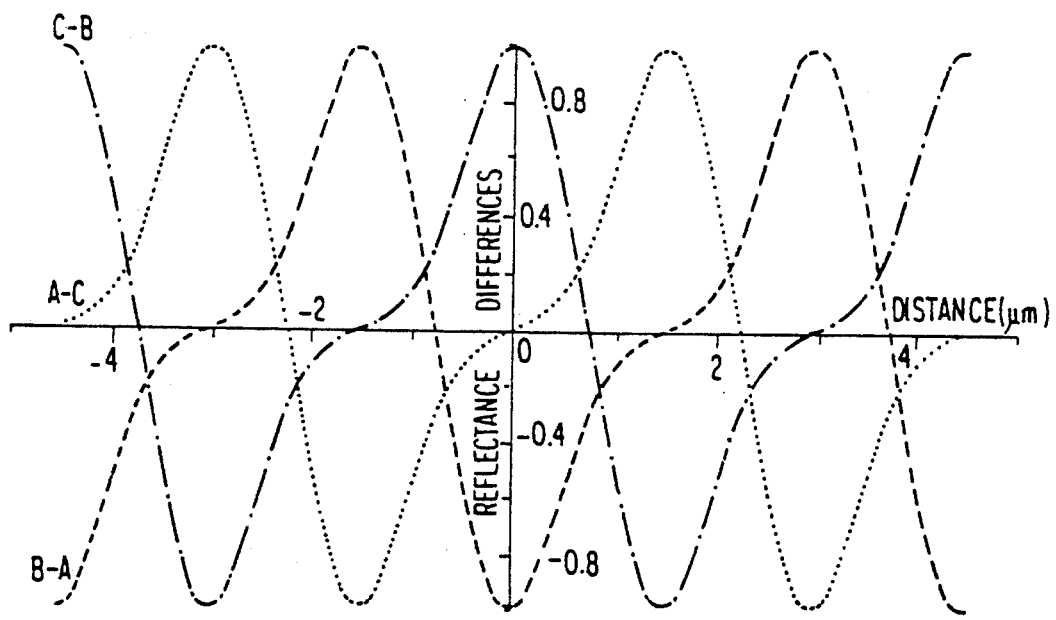
FIG. 10 is a graph of all three reflectance difference combinations, A-C, B-A and C-B, for a three-phase system that alternates between inside and outside edge pairs.

The details of this three-phase system are shown in FIGS. 7 to 10. FIG. 7 shows the variation of reflectance, as measured at the center of row A, as a function of radial distance. Note that there are two minima of reflectance, one as the spot encounters the depression and one as the spot leaves it. They are identical in shape. FIG. 8 shows three such traces for rows A, B and C, each offset from each other by 1.5 $\mu$m. The track centers occur where two of these reflectance traces intersect, and the track error signal (TES) is found from the differences in the reflectances. FIG. 9 shows the difference between the reflectance at the center of row A and that at the center of row C. The two steep, negative sloped portions are used as the TES for two different tracks, one where the spot is outside both rows A and C depressions, the other where the spot is inside both rows A and C depressions. The track center occurs where the TES crosses zero value, and that location is independent of variations in the depression dimensions as those variations cancel in the difference calculation. FIG. 10 shows the TES for all three pairs of rows. By choosing the appropriate difference pair, a valid TES can always be found.

While this pattern is easy to fabricate because of the large size of the features, the slope of the TES varies with feature size variation. In such a case, the slope of the inside pairs differs from that of the outside pairs. It is desirable to have the slope, and thus the gain of the servo system, constant from track to track, and if possible, for it to be relatively independent of feature-size variations.

Figure 11:
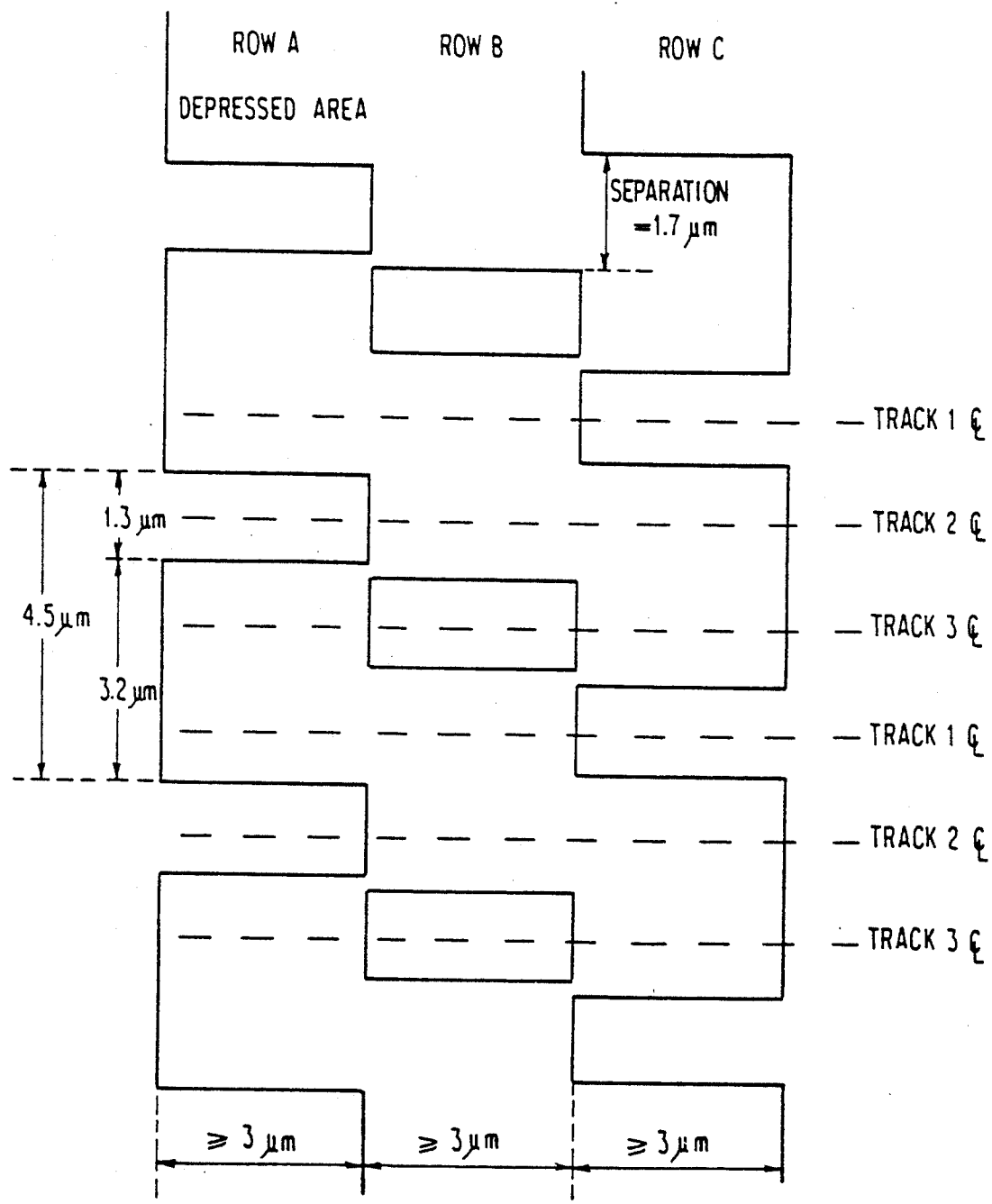
FIG. 11 is a three-phase servo pattern with inside pairs.

FIG. 11 shows a three-phase system that uses only inside pairs, so that the slopes and gain are constant from track to track. This requires additional edges. The depressions are 3.2 $\mu$m long with a 1.3 $\mu$m spacing, and the pattern has a repetition period of 4.5 $\mu$m. The three rows are offset from each other by 1.5 $\mu$m, but the relevant separation between pairs of edges being compared is now always 1.7 $\mu$m. For track 1, the difference between the reflectance at the center of row A and that at the center of row B is sensed. On track 2, rows B and C are used, and on track 3, rows C and A are used.

Figure 12:
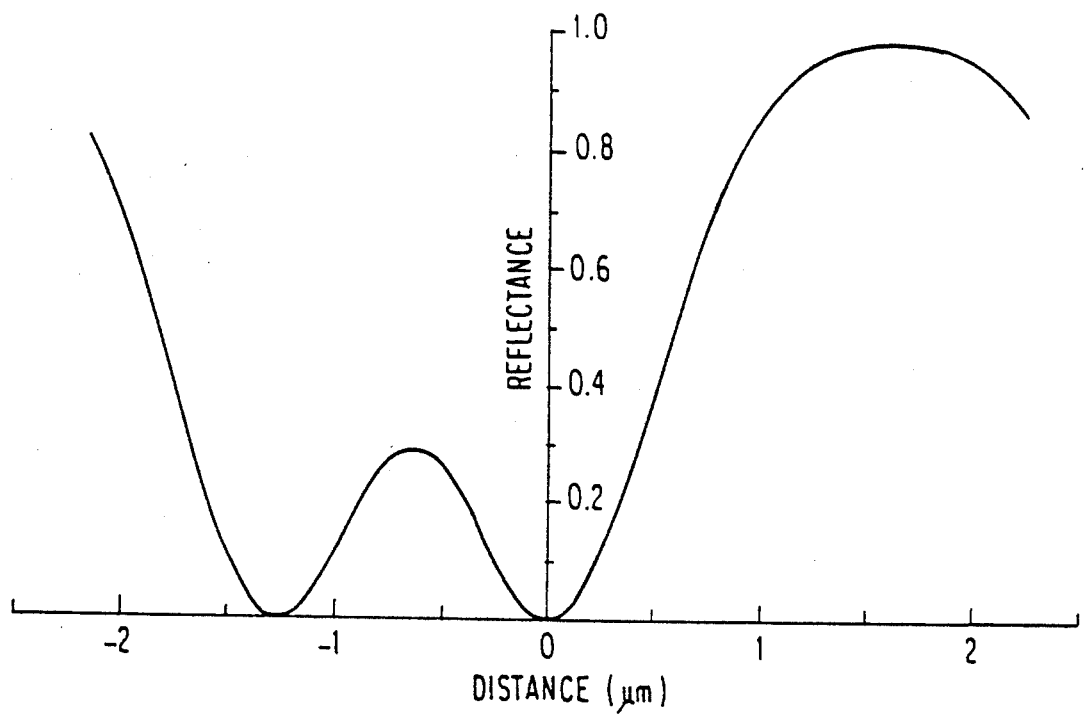
FIG. 12 is a graph of the reflectance of row A for a three-phase servo for the case of inside pairs.
Figure 13:
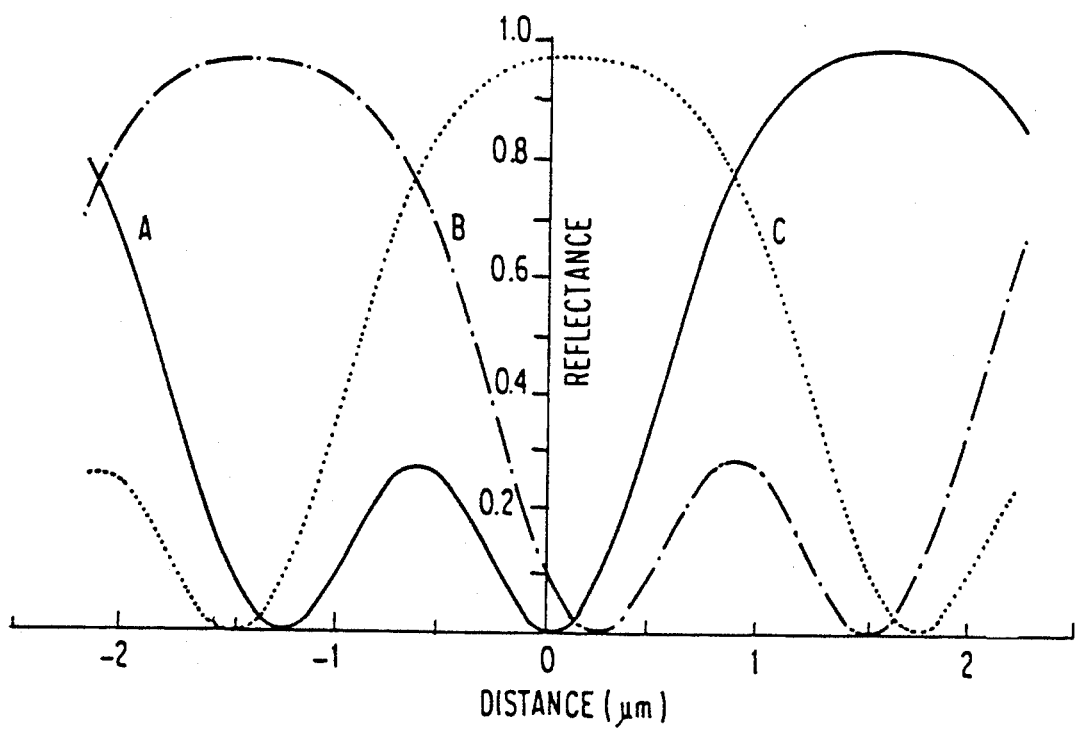
FIG. 13 is a graph of the reflectances of rows A, B and C for a three-phase servo for the case of inside pairs.
Figure 14:
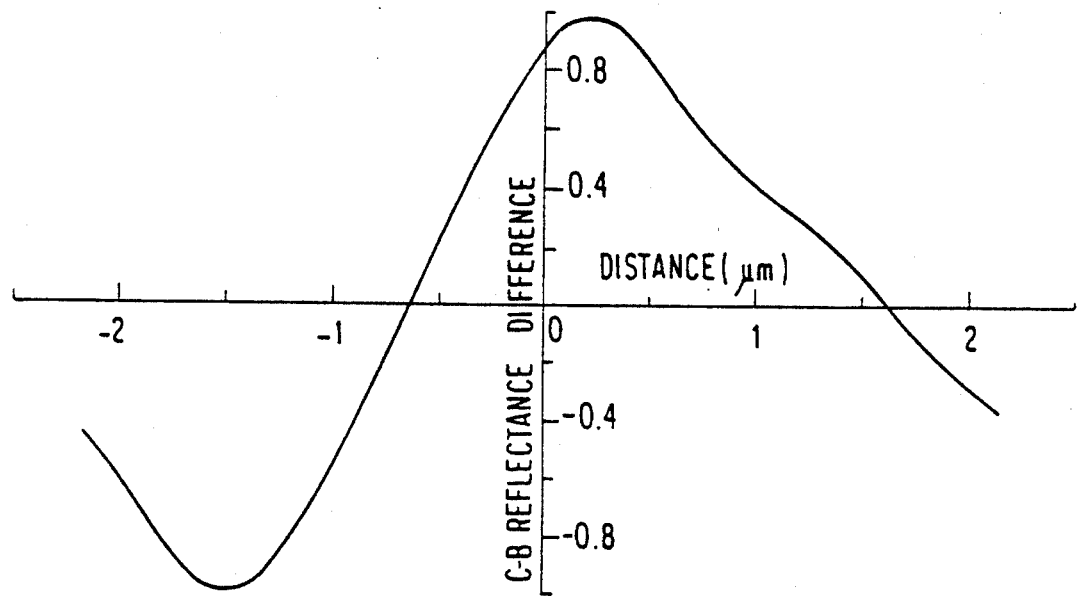
FIG. 14 is a graph of the reflectance difference C-B for the three-phase servo system for the case of inside pairs.
Figure 15:
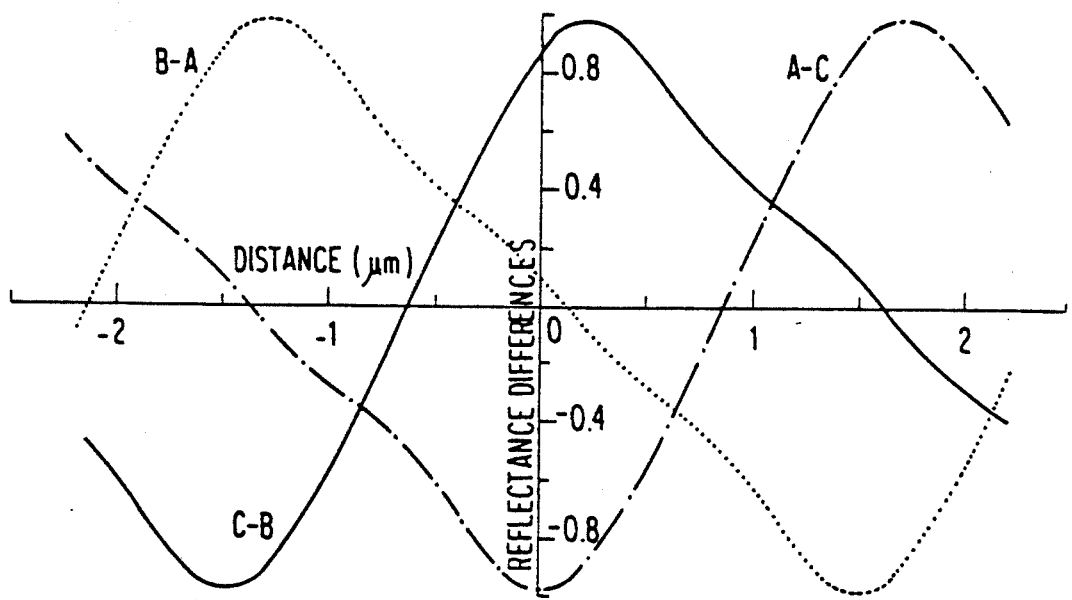
FIG. 15 is a graph of all three reflectance difference combinations, A-C, B-A and C-B, for the three-phase servo system that uses inside edge pairs.

The detailed operation of this three-phase system is illustrated in FIGS. 12 to 15. FIG. 12 shows the variation of reflectance, measured at the center of row A, as a function of radial distance. Note that the two minima are now so closely spaced that the reflectance from outside the depression never rises to the 50% level. FIG. 13 shows three such traces for rows A, B and C, each offset from the other by 1.5 $\mu$m. The track centers occur where two of these reflectance traces intersect, and the TES is found from the difference of the reflectances. FIG. 14 shows the difference between the reflectance at the center of rows B and C. The positive-slope portion is used as the TES for that track. The track center occurs at the zero crossing, and is independent of feature size because it is the difference of two inside reflectances. The slope of the TES is lower than for the previous case of FIG. 9, but it is much more nearly constant over a wider range. Although not shown explicitly in FIG. 5, the separation between compared edges used in this case, 1.7 82 m, yields approximately the maximally flat TES slope that can be achieved over a wide radial range. If a constant slope and gain are critical, this could be a good choice. FIG. 15 shows the TES for all three pairs of rows. The monotonically increasing portion of each TES is wider than the track pitch, so that the useful TES portions overlap and there is never any ambiguity as to spot position or direction of spot motion. However, the slope and servo gain still vary with feature size variations.

The structure of FIG. 13 has 3.2 $\mu$m depressions with 1.3 $\mu$m spaces, with a useful compared-edge separation of 1.7 $\mu$m. The same result and useful edge separation could be realized as well by interchanging the depressed areas and the spaces between them, giving 1.3 $\mu$m depressions with 3.2 $\mu$m spaces. They are essentially equivalent, as it is as difficult to achieve a 1.3 $\mu$m depression as to get 1.3 $\mu$m space between depressions. The achievability of such small features is a severe limitation because it allows little room for further increases in track density.

Figure 16:
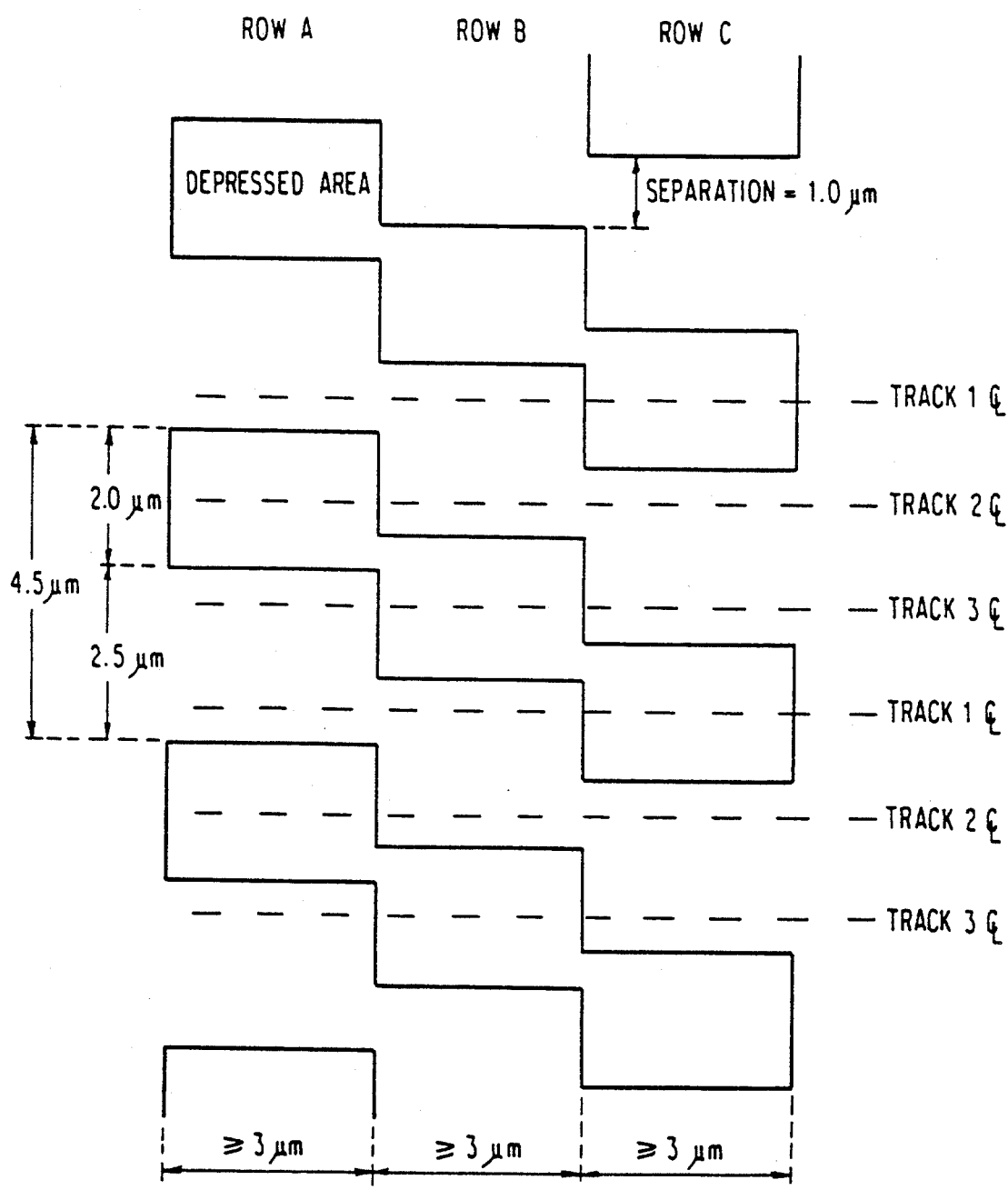
FIG. 16 is a three-phase servo pattern with outside pairs and constant slope.

FIG. 16 illustrates a three-phase system, using only outside pairs, which has a TES slope that is nearly independent of feature size variation. As can be seen from FIG. 5, as the edge separation is varied, the slope increases, goes through a maximum, and then decreases. the maximum occurs at a separation of about 0.95 $\mu$m, and the variation of slope with feature size is very small in the neighborhood of that maximum. The pattern of FIG. 16 has an edge separation of 1.0 $\mu$m. As noted previously, an equivalent pattern can be achieved by interchanging depressions and spacings, which would yield depressions 2.5 $\mu$m long with 2.0 $\mu$m spaces. For track 1, the difference between the reflectance at the center of row A and that at the center of row B are sensed, both from the outside depression. For track 2, rows B and C are used, and for track 3, rows C and A are used.

Figure 17:
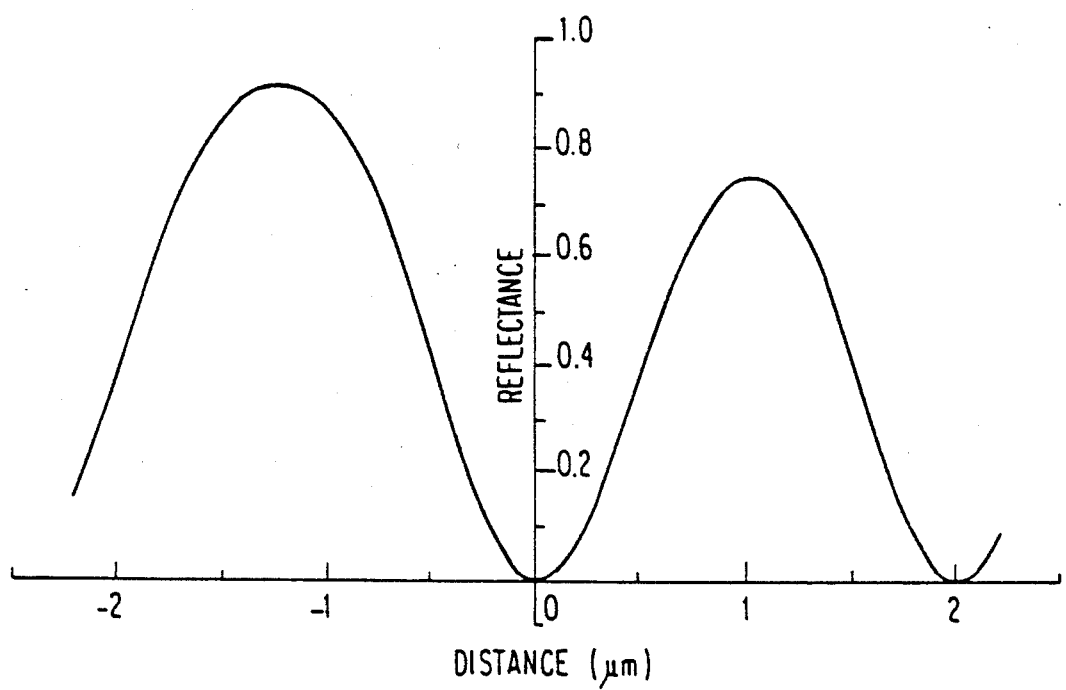
FIG. 17 is a graph of the reflectance of row A for a three-phase servo for the case of outside pairs.
Figure 18:
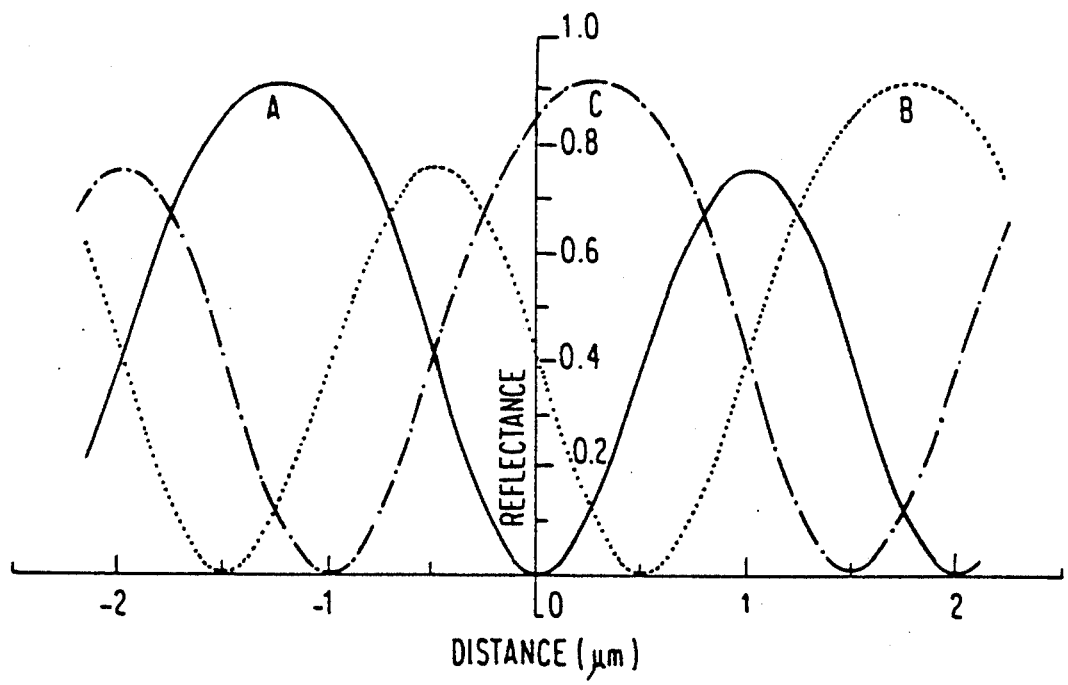
FIG. 18 is a graph of the reflectances of rows A, B and C for a three-phase servo for the case of outside pairs.
Figure 19:
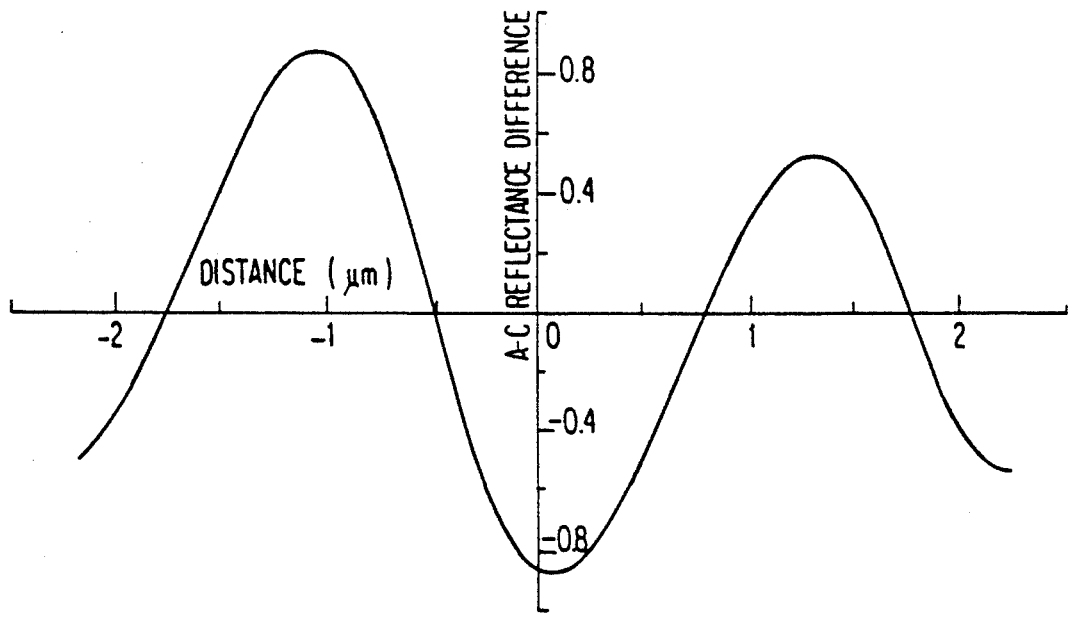
FIG. 19 is a graph of the reflectance difference A-C for a three-phase servo system that uses outside edge pairs.
Figure 20:
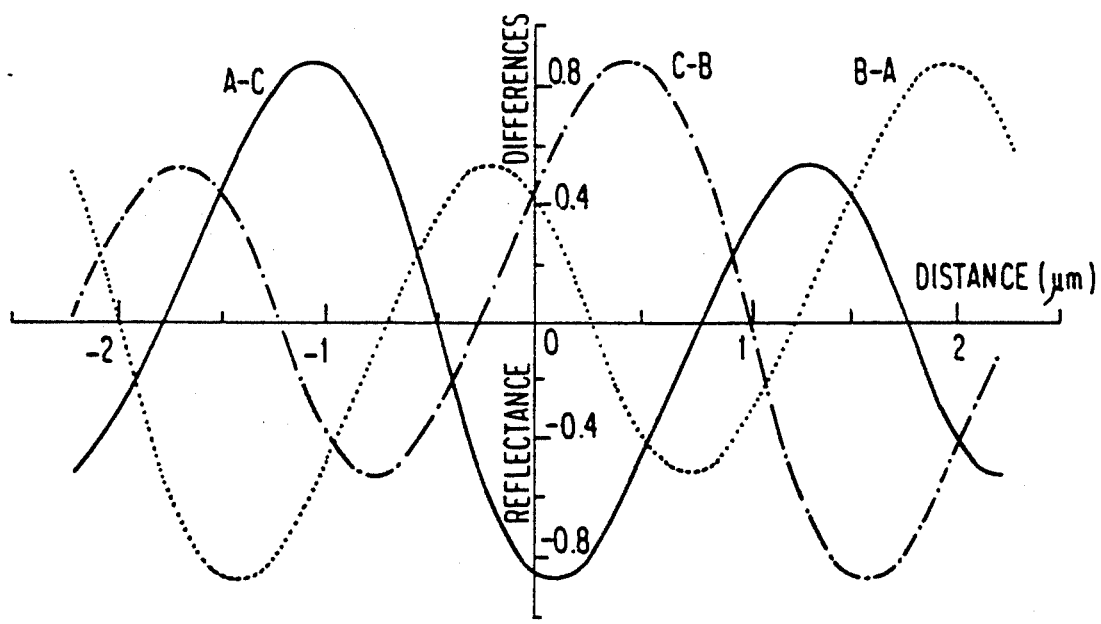
FIG. 20 is a graph of all three reflectance difference combinations, A-C, B-A and C-B, for the three-phase servo system that uses outside edge pairs.

The details of operation of this system are illustrated in FIGS. 17 to 20. FIG. 17 shows the variation of reflectance in row A with radial distance. The reflectance goes to a minimum at each edge crossing, but never reaches a relative unity value because the spot is always within 1.5 $\mu$m of one of the edges. FIG. 18 shows the reflectance traces of rows A, B and C each offset from the other by 1.5 $\mu$m. The track centers are now defined at the intersections that occur near the 40% relative reflection level. FIG. 19 shows the reflectance difference between rows A and C. The useful TES portion is the larger negative slope section, with the track center at that zero crossing. The track center location and the slope of the TES are nearly independent of feature size variations. FIG. 20 shows the TES for all three pairs of rows. The slope and gain at and around the track center are also at or near the maximum that can be achieved. In this configuration, both the depression length and space are greater than the track pitch, which was one of the goals of the invention, so that the pattern can be extended to higher track densities. This is probably the optimum three phase servo pattern that can be found because it has all the desired features with a minimal width along the data track.

One problem remains with the pattern in FIG. 16. As can be seen in FIG. 20, the useful ranges of the three TES do not overlap, as did those in FIG. 15, which leads to a problem of knowing which TES pair to use and of determining an exact location when the spot is between tracks. When the spot is close to the track center, it is adequate to derive the TES in use from the two rows that have the lower reflectance levels at the center, but if the spot is more than 0.24 $\mu$m off track, that procedure is no longer adequate. The ambiguity can be resolved in all cases by using the additional information provided by the occurrence of reflectance minima found at the beginning edge of row A and at the outer edge of row C. Note that in the vicinity of track 1, there will always be a reflectance minimum at the trailing edge of row C, and that in the vicinity of track 2, there will always be a reflectance minimum at the leading edge of row A. (It is assumed for purposes of illustration that the spot moves from left to right in the figures.)

The following three rules are adopted: (1) When there is a minimum at the leading edge of row A and the reflectance level at the center of row A is greater than one or more of rows B and C, use the difference of rows B and C for the TES. (2) When there is a minimum at the trailing edge of row C and the reflectance level at the center of row C is greater than one or more of rows A and B, use the difference of rows A and B for the TES. (3) When neither of the first two conditions are fulfilled, use the difference of rows C and A for the TES. These rules ensure that the correct TES is in use. The exact spot location relative to the tracks can then be determined accurately in every case, except when the spot is close to the center between two adjacent tracks. In that case, there is some indeterminacy as to the exact location, but none with respect to the nearest track or as to the sign of the TES. If exact resolution of the spot location is required when TES is near the boundary between two tracks, it can be found by reference to one of the other TES pairs. From FIG. 20, it can be seen that every point there is at least one of the TES that has a negative slope to the right, so that the location can always be resolved.

At this point, the relationship between track pitch, feature length, and edge separation for those three-phase designs that have a period of three times the track pitch, as in FIGS. 11 and 14, are examined. It is found that the outside separation equals two times the track pitch minus the depression length and that the inside separation equals the depression length minus the track pitch. Thus, the pattern can be designed for any desired separation by choosing the appropriate depression length.

Figure 21:
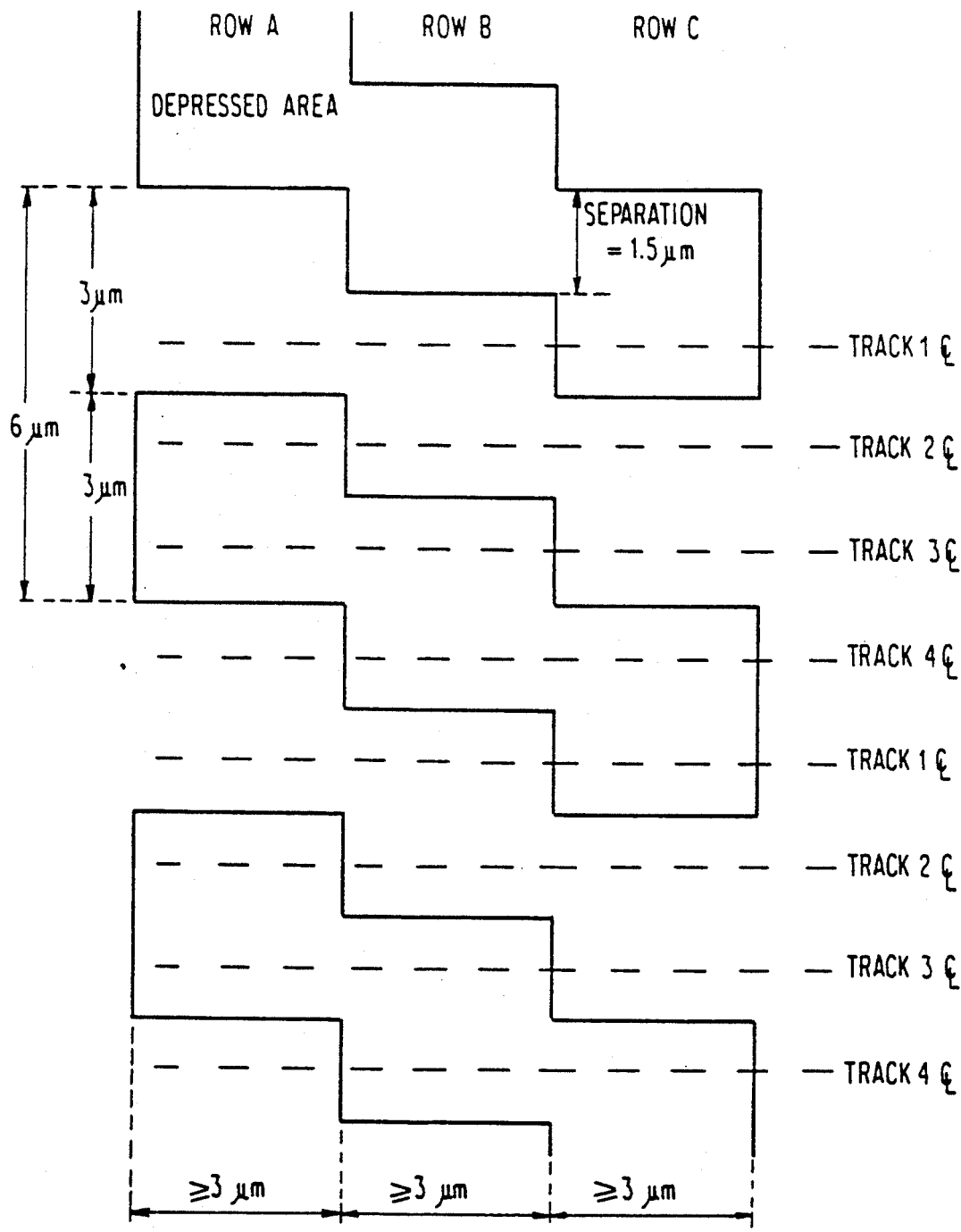
FIG. 21 is a four-phase servo pattern in three rows.

Servo patterns with three rows of depressions are economical of the space they occupy in the available track area, but they have limitations in terms of the attainable depression sizes and the constancy of the TES slope. FIG. 21 shows how a four-phase system can be achieved with only three rows, with depressions 3 $\mu$m long with 3 $\mu$m spaces. The radial offset from row A to row B is 1.5 $\mu$m, as is the offset between rows B and C; however, row C is merely a reversed copy of row A. The effective edge separation for comparisons is 1.5 $\mu$m, as in FIG. 6.

The system in FIG. 6 alternately uses inside and outside pairs. The system in FIG. 11 uses only inside pairs, and the system in FIG. 16 uses only outside pairs. The pattern on FIG. 21 uses outside pairs for tracks 1 and 2 and inside pairs for tracks 3 and 4. For track 1, rows A and B, both outside, are used. For track 2, rows B and C, both outside, are used. For track 3, rows A and B, both inside, are used. For track 4, rows B and C, both inside, are used. Thus, this scheme always uses row B, alternately comparing it with rows A and C and alternating the use of inside and outside edges, depending on whether the spot is inside or outside of row B depressions. While the track center locations are independent of feature size, the slopes are size dependent, as in the case of FIG. 6. Furthermore, the slopes of the inside and outside pair of TES differ as the feature size departs from the 3 $\mu$m nominal, and no further variations of this pattern are possible.

Further improvement can be achieved by adding a fourth row of depressions, which gives added degrees of freedom in the design of the patterns. A four-phase, four-row system can be readily derived from the pattern of FIG. 21 by adding row D, which is a reversed copy of row B. This offers added flexibility by eliminating the restriction of always having to use row B. The dimensions can then be changed to achieve various desired characteristics of the servo system. As with the three-phase systems, the relationship between the track pitch, feature lengths, and separation values are found. The outside separation now equals three times the track pitch minus the depression length, and the inside separation still equals the length minus the track pitch. However, we can now realize larger values of the depression lengths and spacings than were possible with the comparable three-phase servo systems. Because in three-phase systems the sum of the inside and outside separations equaled the track pitch, it was only possible to use either an inside or an outside separation; both were never simultaneously usable. In the four-phase systems the sum of the two separations equals twice the track pitch, so it is possible to use both the inside and outside edge separations with most desirable patterns.

Figure 22:
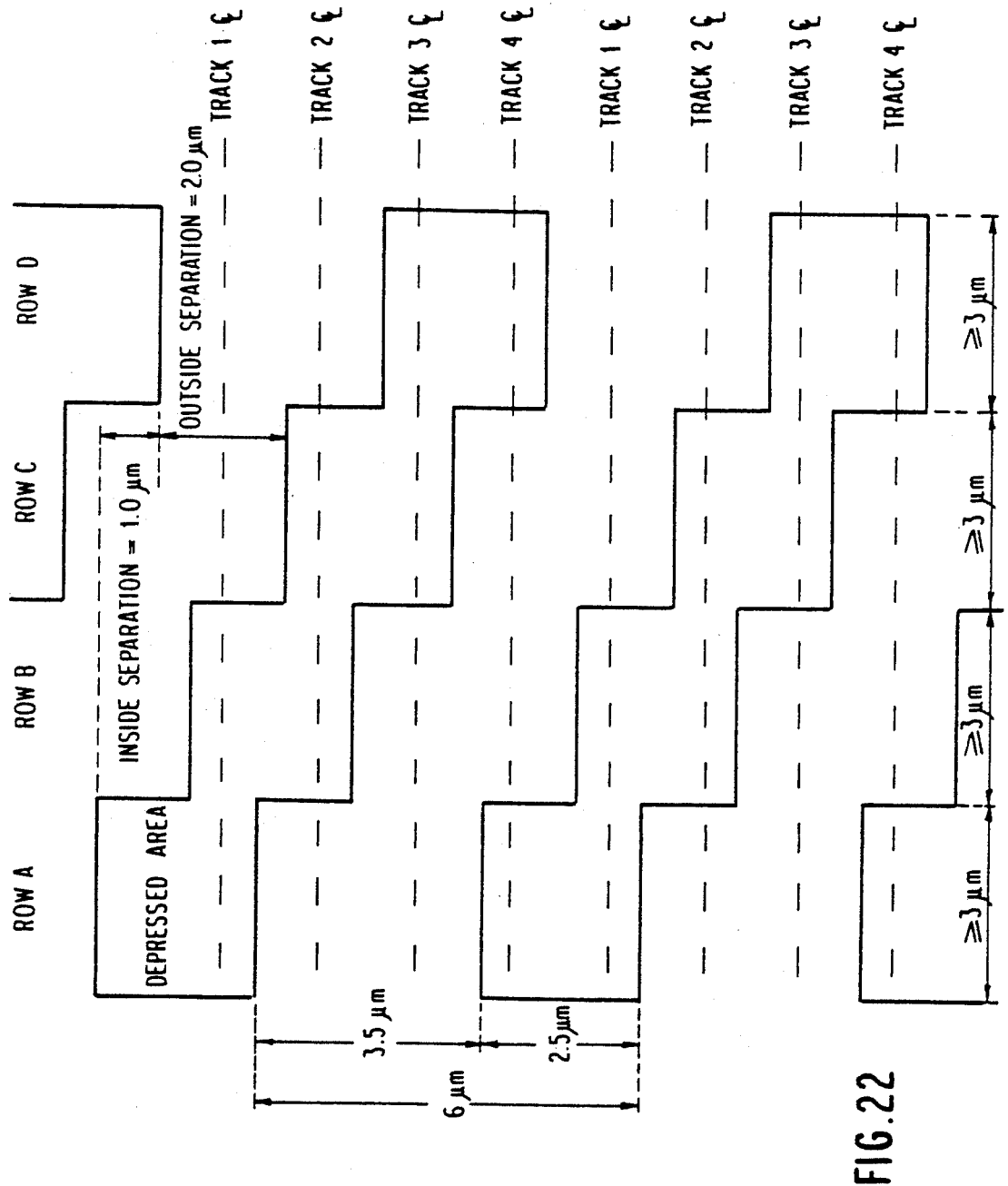
FIG. 22 is a four-phase servo pattern in four rows.

FIG. 22 shows a four row, four-phase servo system. The depressions are 2.5 $\mu$m long with 3.5 $\mu$m spacings, giving a 6.0 $\mu$m period. The inside separation is 1.0 $\mu$m, which is approximately at the point of maximum slope of the TES and of smallest variation of slope with depression size variation. The outside separation is 2.0 $\mu$m, which yields TES with a broad range that overlap each other so as to eliminate location or direction ambiguity problems. Both can be used as desired. For track 1, either rows A and B, inside, or rows C and D, outside, are used. For track 2, rows B and C, inside, or rows D and A, outside, are used. For track 3, rows C and D, inside, or rows A and B, outside, are used. For track 4, rows D and A, inside, or rows B and C, outside, are used.

Figure 23:
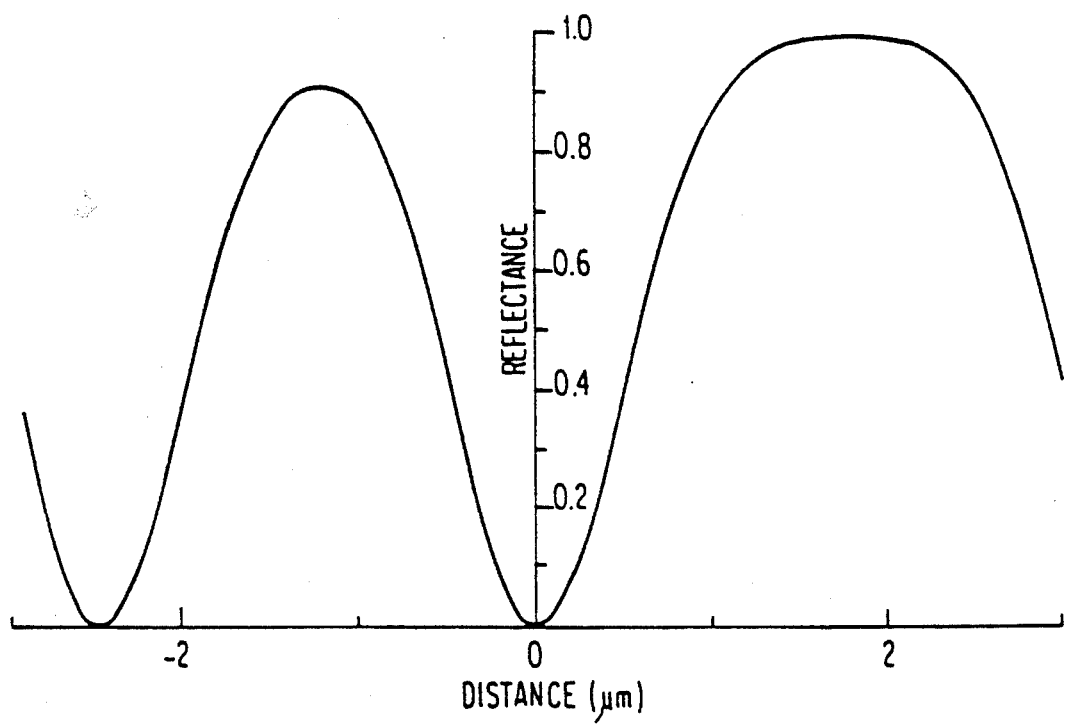
FIG. 23 is a graph of the reflectance of row A for the four-phase servo pattern of FIG. 22 with 2.5 μm lengths and 3.5 μm spaces.
Figure 24:
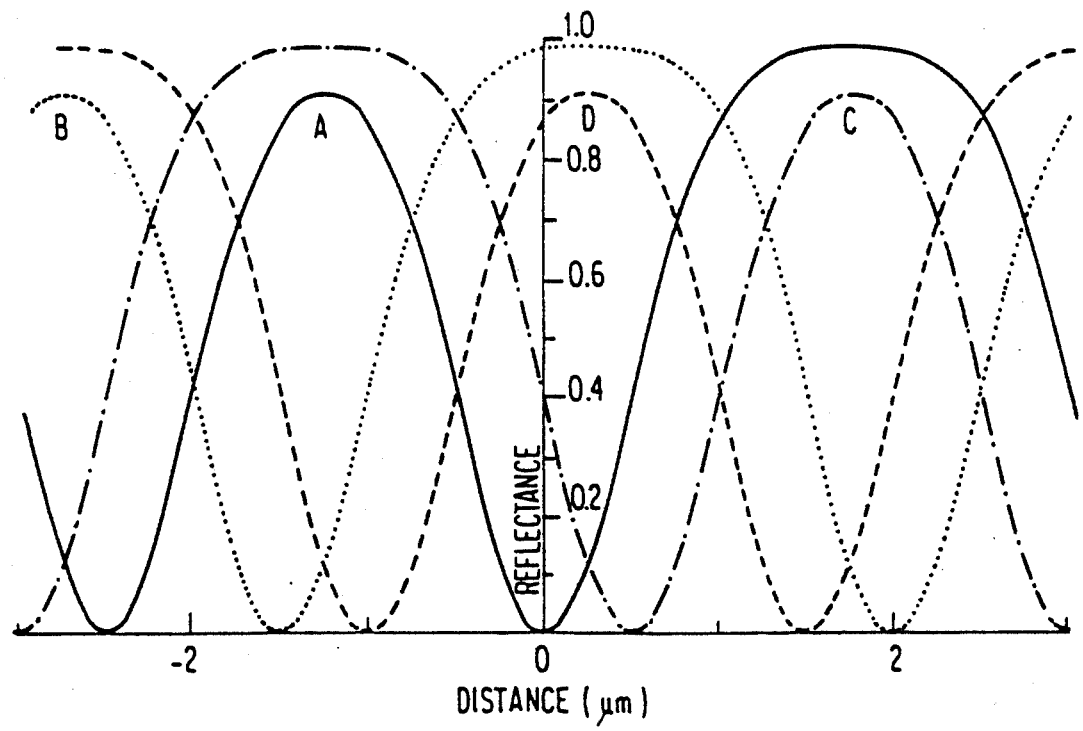
FIG. 24 is a graph of reflectances of rows A, B, C, and D for the four-phase servo system with 2.5 μm lengths and 3.5 μm spaces.
Figure 25:
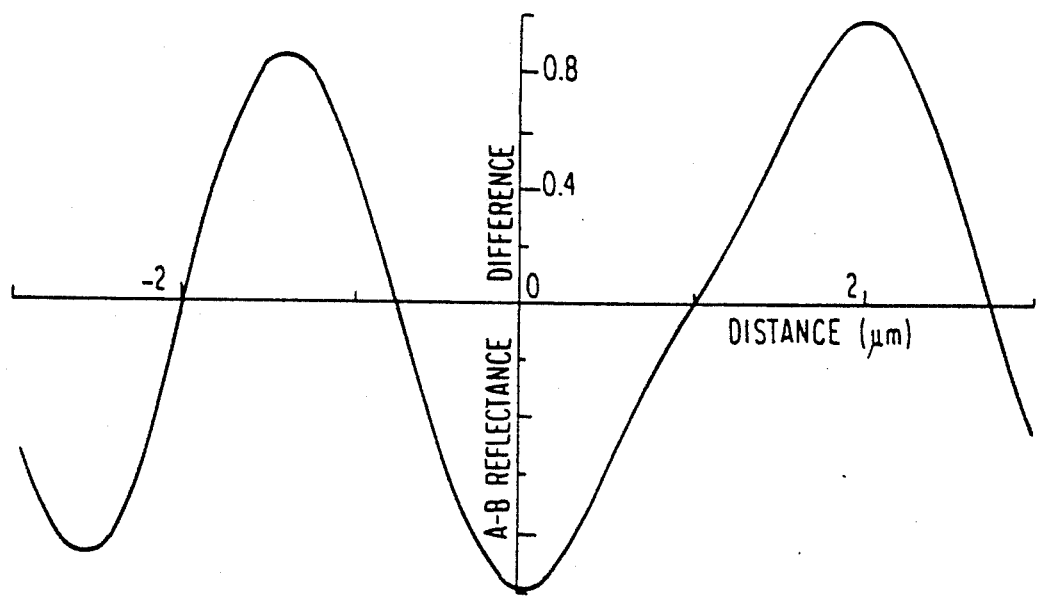
FIG. 25 is a graph of the reflectance difference A-B for the four-phase servo system with 2.5 μm lengths and 3.5 μm spaces.
Figure 26:
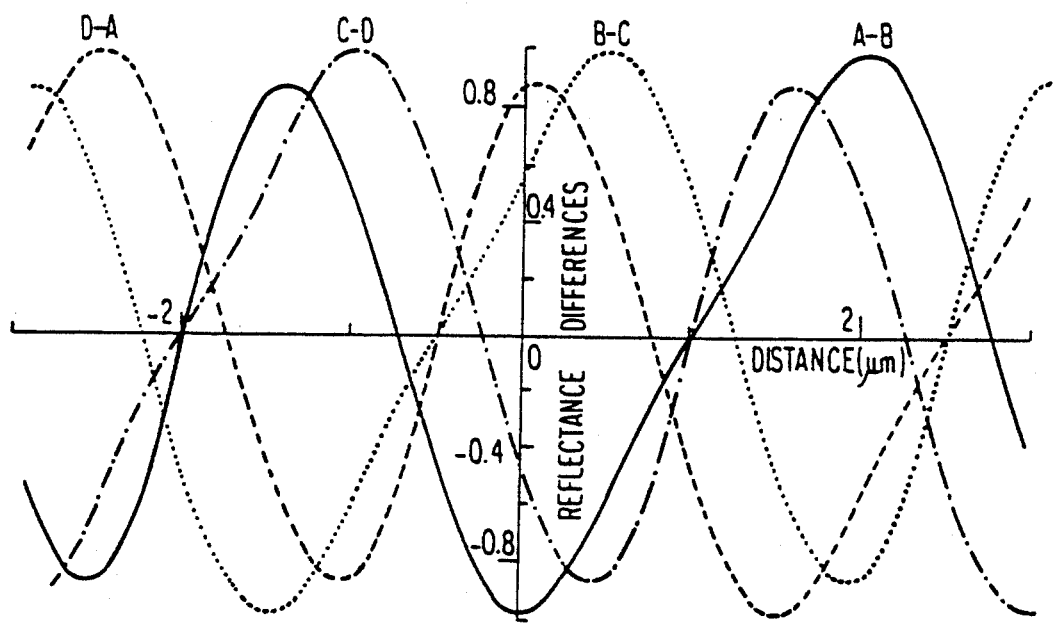
FIG. 26 is a graph of four reflectance difference combinations, A-B, B-C, C-D, and D-A, for the four-phase servo system with 2.5 μm lengths for the four-phase servo system with 2.5 μm lengths and 3.5 μm spaces, showing the track error signal.

Details of the operation are illustrated in FIGS. 23 to 26. The reflectance trace of row A is shown in FIG. 23, and all four reflectance traces are shown in FIG. 24. The track centers are located at the points where there are two intersections of the reflectances, the upper one being the outside pair with a 2.0 $\mu$m separation and wide range of utility, and the lower one being the inside pair with a 1.0 $\mu$m separation and a high and nearly constant slope. FIG. 25 shows the reflectance difference between row A and row B. The steep, positive-slope portion on the left is the inside pair portion, and the shallower but wider positive-slope portion on the right is the outside pair portion. All four row pair combinations are shown in FIG. 26. The wide outside pairs could be used during seek operations to ensure location and motion direction with certainty, while the narrower inside pairs could be used for high-performance track following once the seek operation has been completed. FIG. 24 shows that because the inside and outside pairs have differing separation values, the pattern of reflectance traces versus position is unique. Spot location within the TES range, and which signal pair to use for TES, can readily be resolved with simple logical circuits that compare the relative magnitude of the reflectance values of the four rows. The relative ordering of the reflectances points to the approximate location within the range and indicates which pair or pairs should be used as TES to provide the exact location.

The existence of two independent TES, derived from different sets of features on the disk, provides redundancy against the adverse effect of defects in the servo-sector areas. If both TES agree with some limit, all is well, but if the difference exceeds some amount, then either an average could be used to reduce the deviation, or a decision procedure based on the range of expected values (derived from past sector data) could be used to choose one value, or else the difference could be used merely as a pointer to cause the sector's servo data to be ignored as unusable. Errors caused by defects in servo sectors would thereby be greatly reduced.

The depression lengths for the four-phase servo of FIG. 22 can be adjusted to suit the servo-system requirements, maintaining the relationships specified above. Obviously, the pattern can be reversed, interchanging depression lengths and spaces, and the order of the rows is clearly arbitrary. The main deficiency of this system lies in the limited range of track offsets over which the TES slope and servo gain remain relatively constant.

A wider range of linearity of the TES, with respect to off-track position and feature size variation, can be obtained by deriving the TES from all four row reflectance values together. The difference of the outside pair added to the difference of the inside pair, when correctly designed, is more constant. As feature size varies, the change in the inside pair is nearly compensated by an opposite change in the outside pair. A good choice of the dimensions is depressions 2.8 $\mu$m long with 3.2 $\mu$m spaces, giving an inside separation of 1.3 $\mu$m and an outside separation of 1.7 $\mu$m. If feature sizes vary by $\pm 0.2$ $\mu$m, the length could be from 2.6 to 3.0 $\mu$m, the spaces 3.4 to 3.0 $\mu$m, the inside separation from 1.1 to 1.5 $\mu$m, and the outside separation from 1.9 to 1.5 $\mu$m. The operation is in every case similar to that previously shown in FIGS. 23 to 26.

Figure 27:
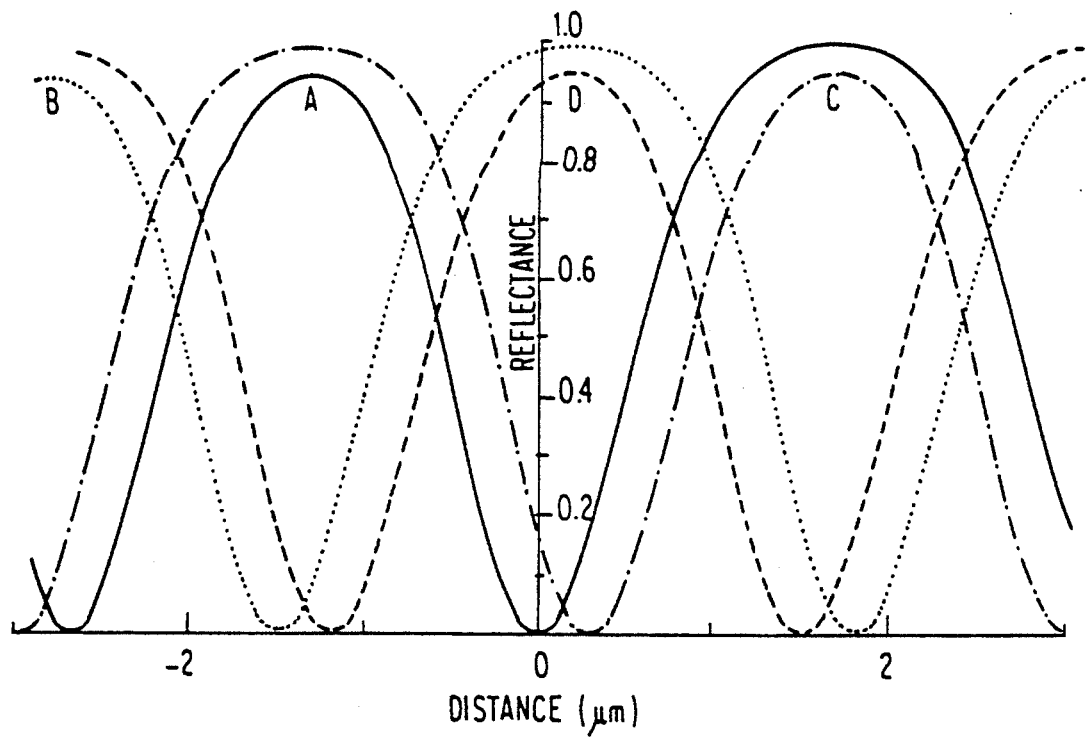
FIG. 27 is a graphs of reflectances of rows A, B, C, and D for a four-phase servo with 2.8 μm lengths and 3.2 μm spaces.
Figure 28:
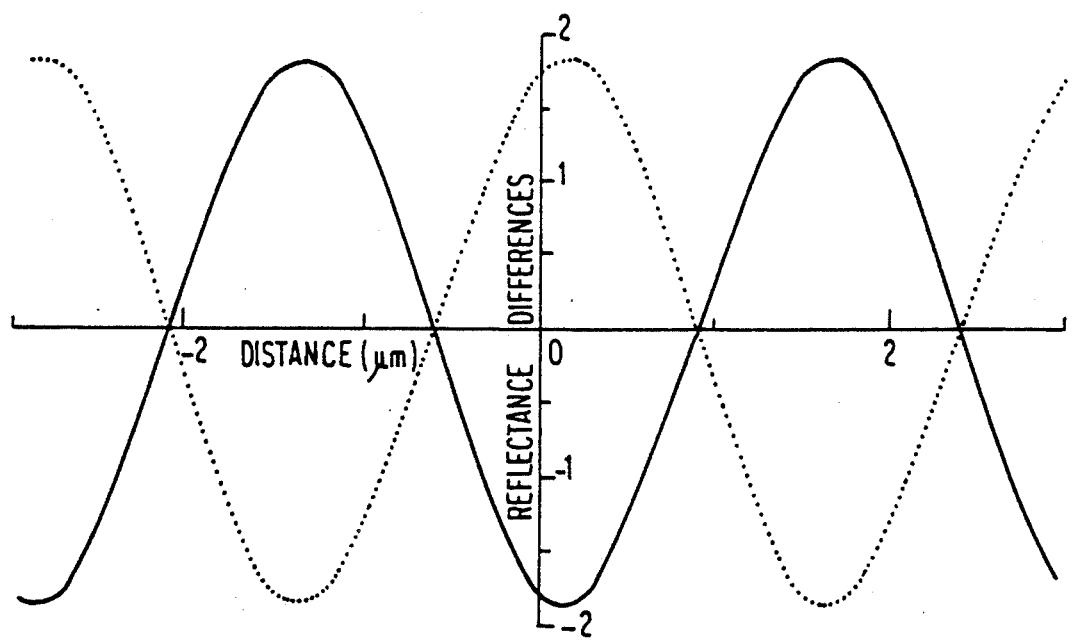
FIG. 28 is a graph of reflectance differences for a four-phase servo with 2.8 μm lengths and 3.2 μm spaces, showing the summed track error signal pairs.
Figure 29:
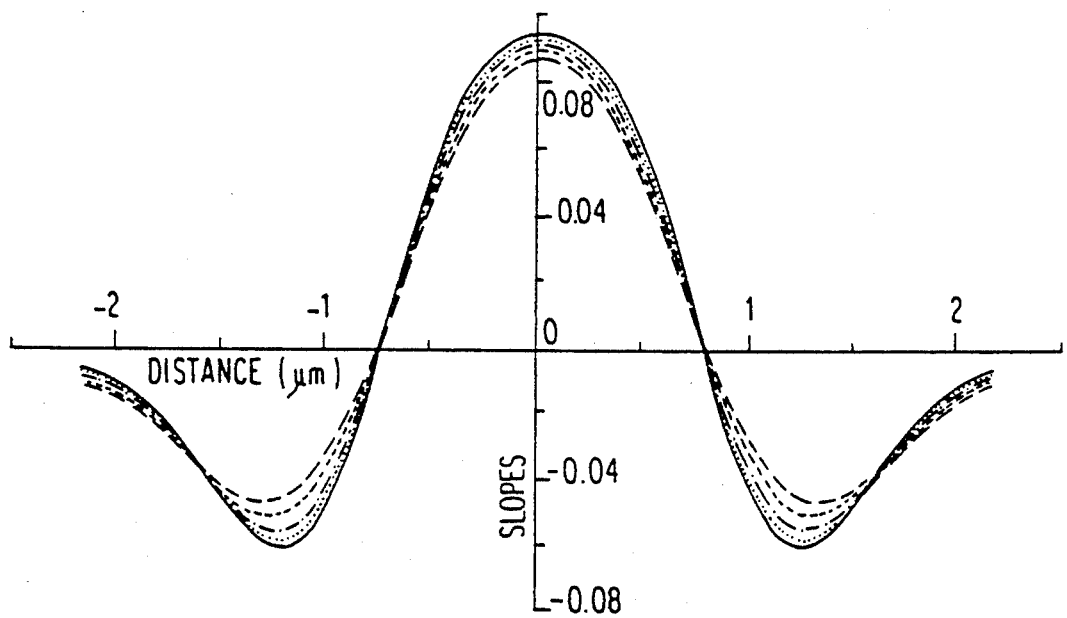
FIG. 29 is a graph showing the summed slopes as a function of spot offset.
Figure 30:
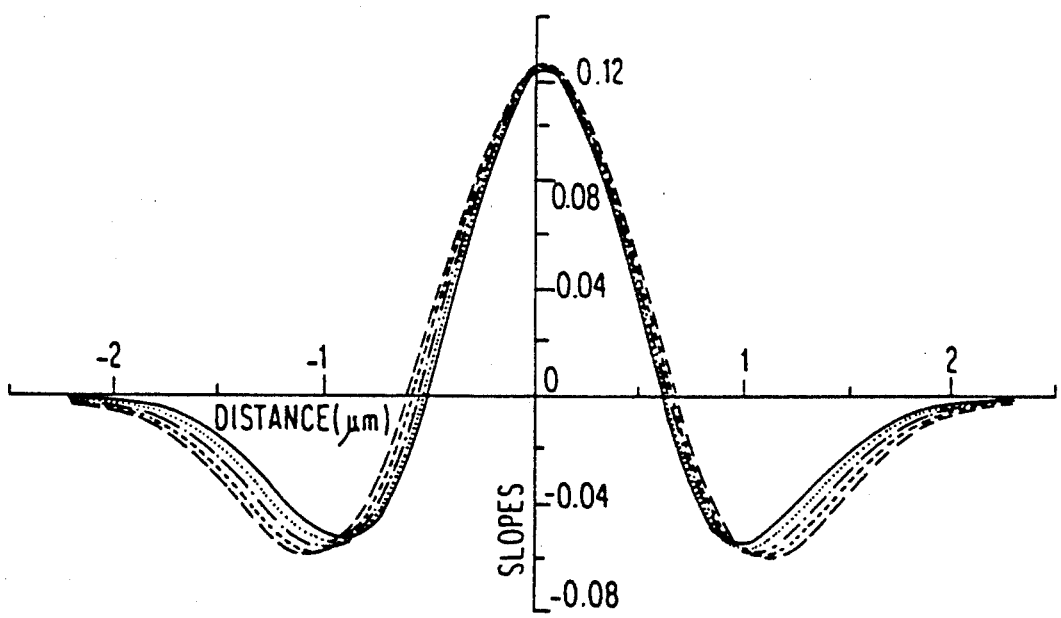
FIG. 30 is a graph showing the single pair slopes as a function of spot offset.

FIG. 27 shows the four row reflectance traces from which the spot location can be found by logic for the case of 2.7 $\mu$m lengths. For the same case, FIG. 28 shows the two TES found by summing the inside and outside pair differences in different combinations. They are identical except for the polarity. The improved constancy of slopes obtained by using all four rows to derive the TES is demonstrated in FIG. 29, which shows the slopes as a function of spot offset for depression lengths 2.6 to 3.0 $\mu$m, a spread of $+0.2$ $\mu$m. By comparison, FIG. 30 shows the slopes for the single pair case previously shown in FIG. 22 for a variation of depression lengths from 2.3 to 2.7 $\mu$m, also a spread of $+0.2$ $\mu$m. The improved tolerance is clearly evident.

If the edge separations are constrained so that even with feature size variations the outside separation is always greater than the inside separation, then simple logic will always indicate the track location and which polarity of TES to use. If row D reflectance is greater than row B and row C is greater than row A, then the spot is nearest a track 1. If row D reflectance is grater than B and row A is greater than C, then the spot is nearest to track 2. If row B reflectance is greater than row D and row A is greater than row C, then the spot is nearest to track 3. If row B reflectance is greater than row D and row C is greater than row A, then the spot is nearest to track 4. No ambiguity can exist.

For the summed TES case just described, the depressions and spaces can of course be reversed, but depression lengths or spaces of exactly 3 $\mu$m need to be avoided to prevent an ambiguity in track position during seek operations. An even greater immunity of slope variation to depression length and track offset variations can be obtained by centering the design on a 3.0 $\mu$m depression length, so that both inside and outside edge separations are nominally 1.5 $\mu$m. However, in this case, additional logic circuit has to be used, as previously described for the pattern in FIG. 16, using occurrence of reflectance minima at the outer edges of the pattern to resolve the ambiguity of spot location with respect to the servo pattern.

A timing marker, not shown in any of the previous figures, can be inserted. This marker consists of a radial depression running from the inner to outer edge of the disk, to help the detection circuit sense when a servo sector is approaching. This marker can be separate from the servo rows so that two edges of the timing marker are always sensed, or it can be immediately adjacent with no separation from the servo rows to save space so that only the initial edge of the timing marker is always seen.

FIG. 3 showed the degree of resolution that can be obtained when the reflectance variation is read as the spot passes the boundary of a depression having a depth of one-quarter wavelength in the substrate. For a Gaussian spot with an FWHM diameter of 0.9 $\mu$m, the spot must be at least 1.5 $\mu$m away from such an edge for the reflectance not to be affected by the presence of that edge. Known optical sector-servo systems have used small size depressions of varying length in the radial direction as a means of coding the track identification, but these suffer from the problems of limited resolution of the optical reading method and tolerances with respect to variations in wavelength and feature sizes. Known methods using small depressions sense the presence or absence of the depressions, as well as their location. Gray codes, which allow only one of a set of elements to change at a given place, are of course well known in the art.

When the above patterns are designed, certain principles must be kept in mind to achieve efficient and effective operation. Because the code features are depth variations, we sense changes in the reflectance, which is a maximum at any point, either inside or outside the depression, as long as the distance from any edge is greater than 1.5 $\mu$m. Only edges can be detected. To achieve large signal amplitudes and to avoid problems with feature and spot size variations, the minimum width and spacing of depressions should be two or more times the spot diameter. Because every depression has a beginning and an end, edges must always occur in pairs. To provide for timing of sensing the edge positions, at least one leading edge must be an unbroken straight line from inner to outer diameter. The pattern must have a "closure" property such that it can be repeated continuously from inner to outer diameter without any breaks or discontinuities in the pattern or coding structure. The pattern must be a gray code such that only one edge changes position at a boundary point. There must be no ambiguities in the determination of spot position from the minima in reflectance, even at the boundary points between the code combinations.

According to the invention, there are provided gray code patterns having large feature sizes and spaces which are easy to fabricate and allow for variation in feature size and spot wavelength. The patterns extend uninterruptedly from the inner to outer edge of the disk so that their presence is always insured; only their location carries information. They may be placed just ahead of, or just after, the tracking codes for greater efficiency, but they could of course be inserted independently. The following examples are for a 0.9 μm spot size and a 1.5 μm track pitch. Scaling of dimensions for differing spot sizes and track pitches will be obvious. For illustration, minimum strip widths and spaces of 2 μm are shown with steps between adjacent positions of 1 μm. Because the detector only has to find which position of a set of discrete positions each edge occupies, the minimum feature sizes and step widths depend on the tolerances in pattern fabrication and on the discrimination capability of the detectors. As before, it is assumed that the spot moves from left to right in the following figures.

Figure 31:
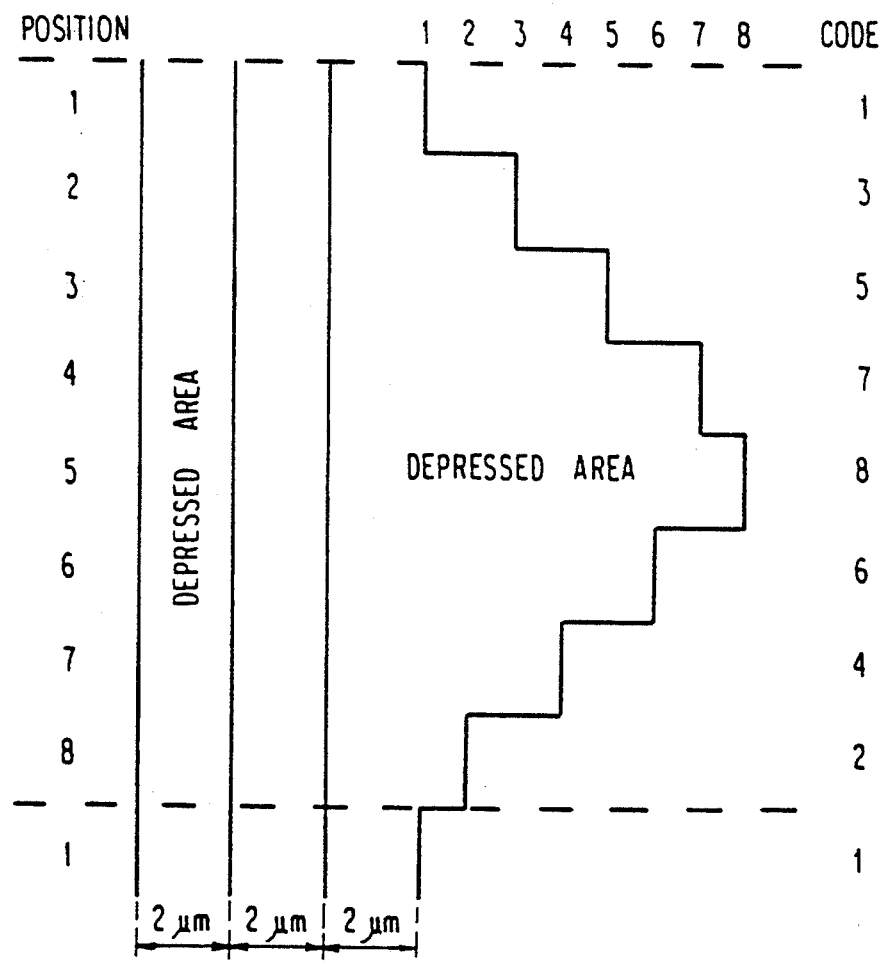
FIG. 31 is an example of a simple length eight code pattern.
Figure 32:
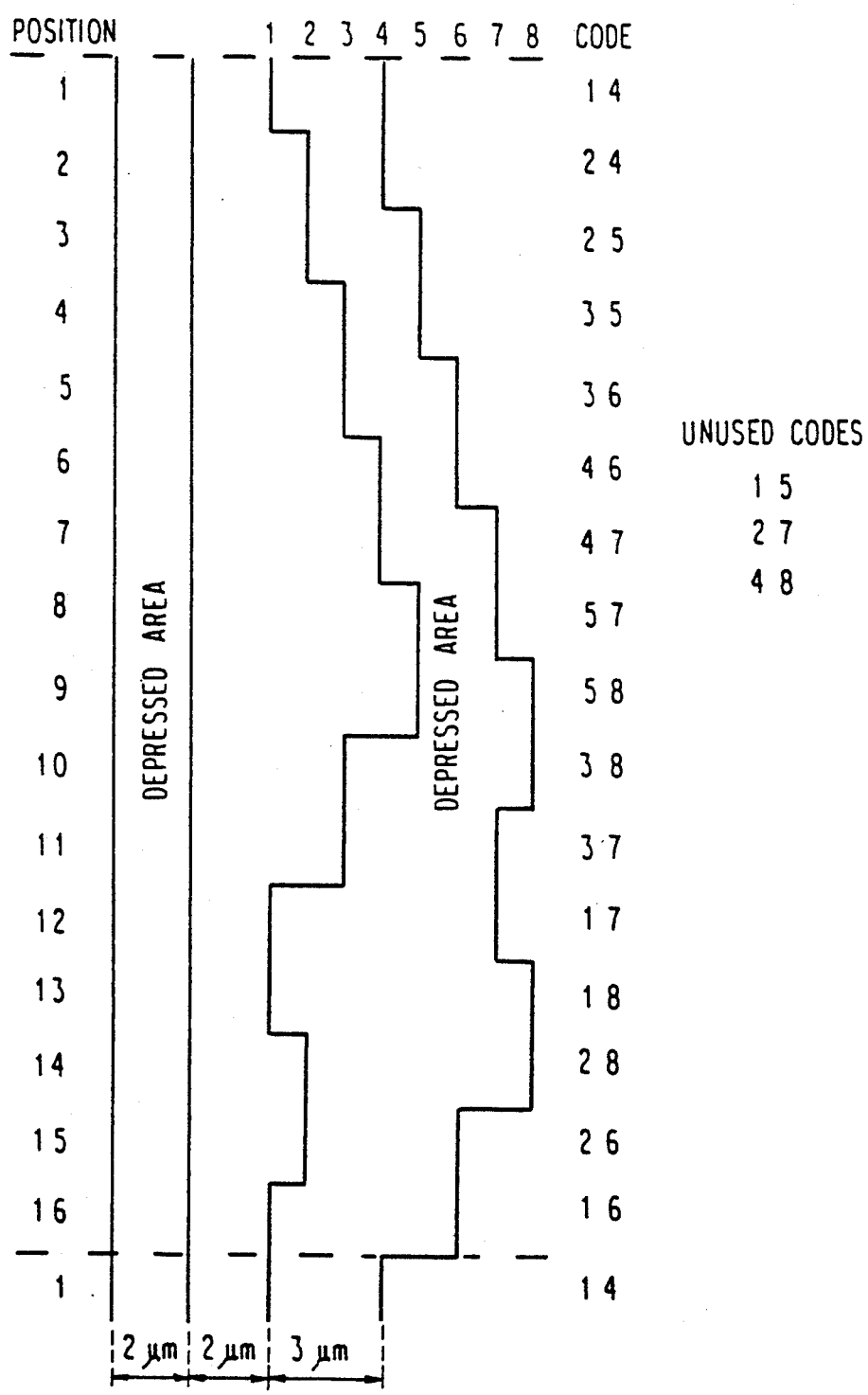
FIG. 32 is a first set length sixteen code pattern of two edges and eight positions.

FIG. 31 shows the simplest possible code, a modified stair-step pattern, with only one variable edge. This pattern is extremely inefficient as it requires 13 μm width for an eight position code. It also has ambiguities that are caused by the fact that it is always the same edge that changes, and it can change in either direction at adjacent boundaries. Clearly inadequate, the pattern is shown here only for reference purposes and as an example of bad design practice FIG. 32 shows a useful pattern with one fixed-edge depression stripe and one with both edges variable. There are sixteen position combinations, which is the maximum that can be achieved with eight possible position locations for the edges. The edge position code can be expressed as pairs of numbers, as noted on the right in the figure, showing the location of the edges at each point of the code. There are twenty-eight possible combinations of eight positions taken two at a time, but not all of these are realizable. The seven combinations, pairs 1-2, 2-3, 3-4, 4-5, 5-6, 6-7, and 7-8, are not allowed because they would violate the requirement that the depression width be equal or greater than a prescribed minimum value. The minimum width and spacing are required to be equal or greater than two time the position step size. Furthermore, the two pairs 1-3 and 6-8 are not allowed because there is no way they can be fitted into the sequence without violating the requirement of no ambiguities. For this reason, pairs 1-4 and 5-8 represent the leftmost and rightmost combinations that can be used. As can be seen from the digital code sequence in the figure, only one number can change from one code to another, and the one that changes must alternate at adjacent boundaries Three unused code combinations are left; the pairs 1-5, 2-7 and 4-8. Because of the restriction that each adjacent pair at a boundary must have one value in common, other unused pairs cannot be inserted without violating that requirement. The pattern in FIG. 32 is therefore the maximum length, sixteen combinations, that can be found under these constraints. This particular arrangement of those sixteen code combinations, however, is not unique. Many permutations on the order of these sixteen codes are possible which satisfy the given constraints, but they are all just reorderings of the same combinations.

Figure 33:
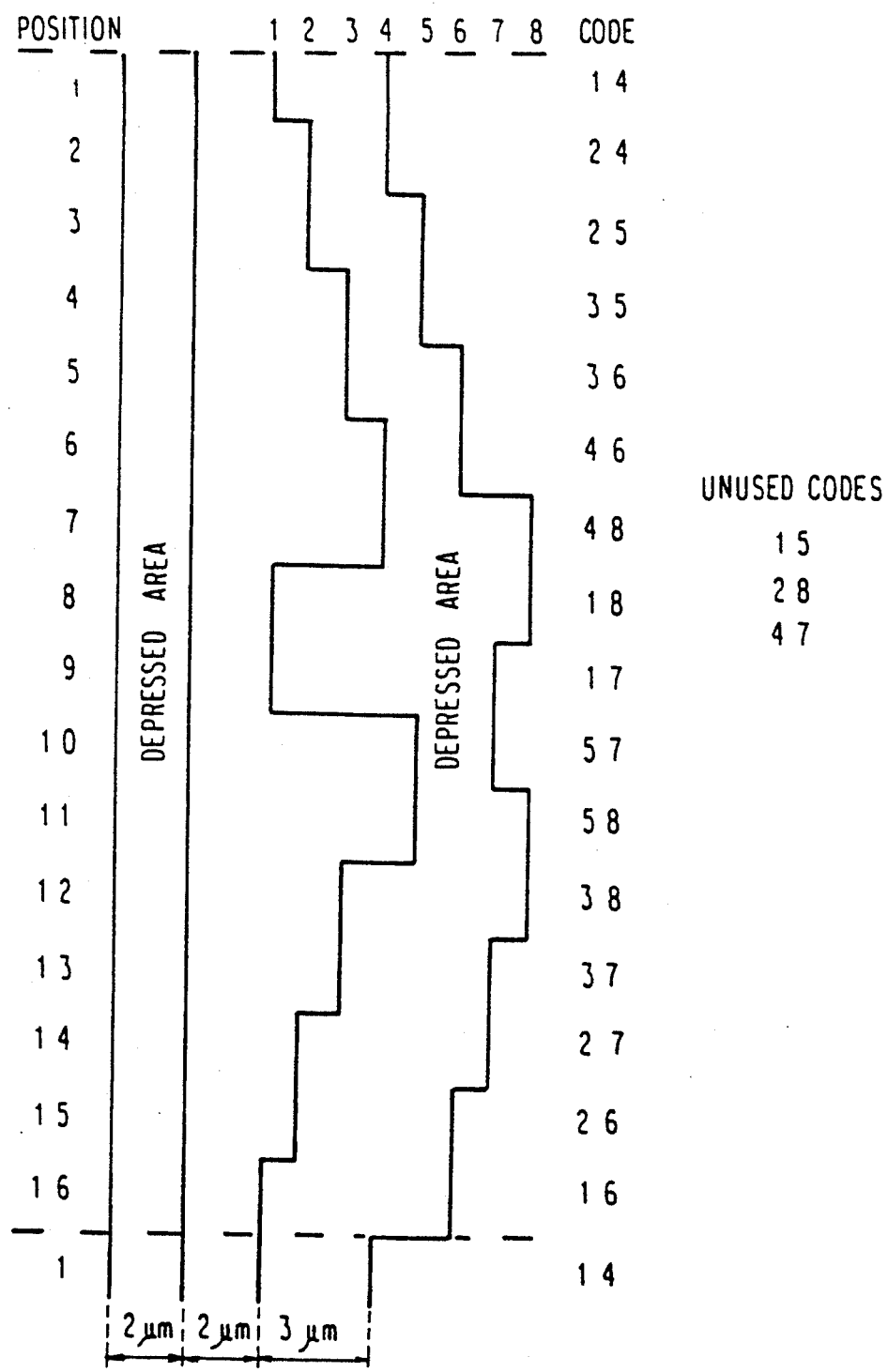
FIG. 33 is a second set length sixteen code pattern of two edges and eight positions.
Figure 34:
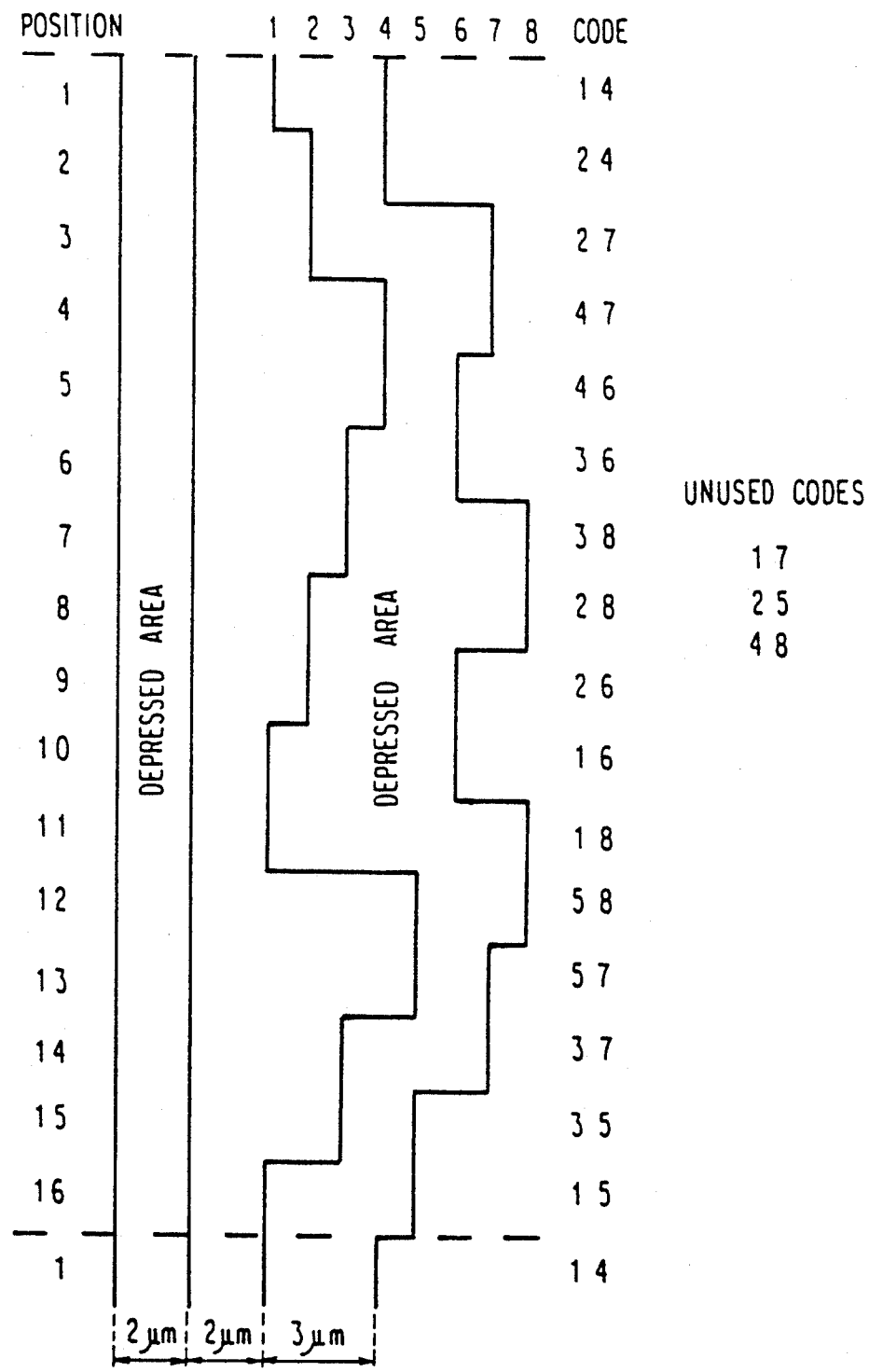
FIG. 34 is a third set length sixteen code pattern of two edges and eight positions.
Figure 35:
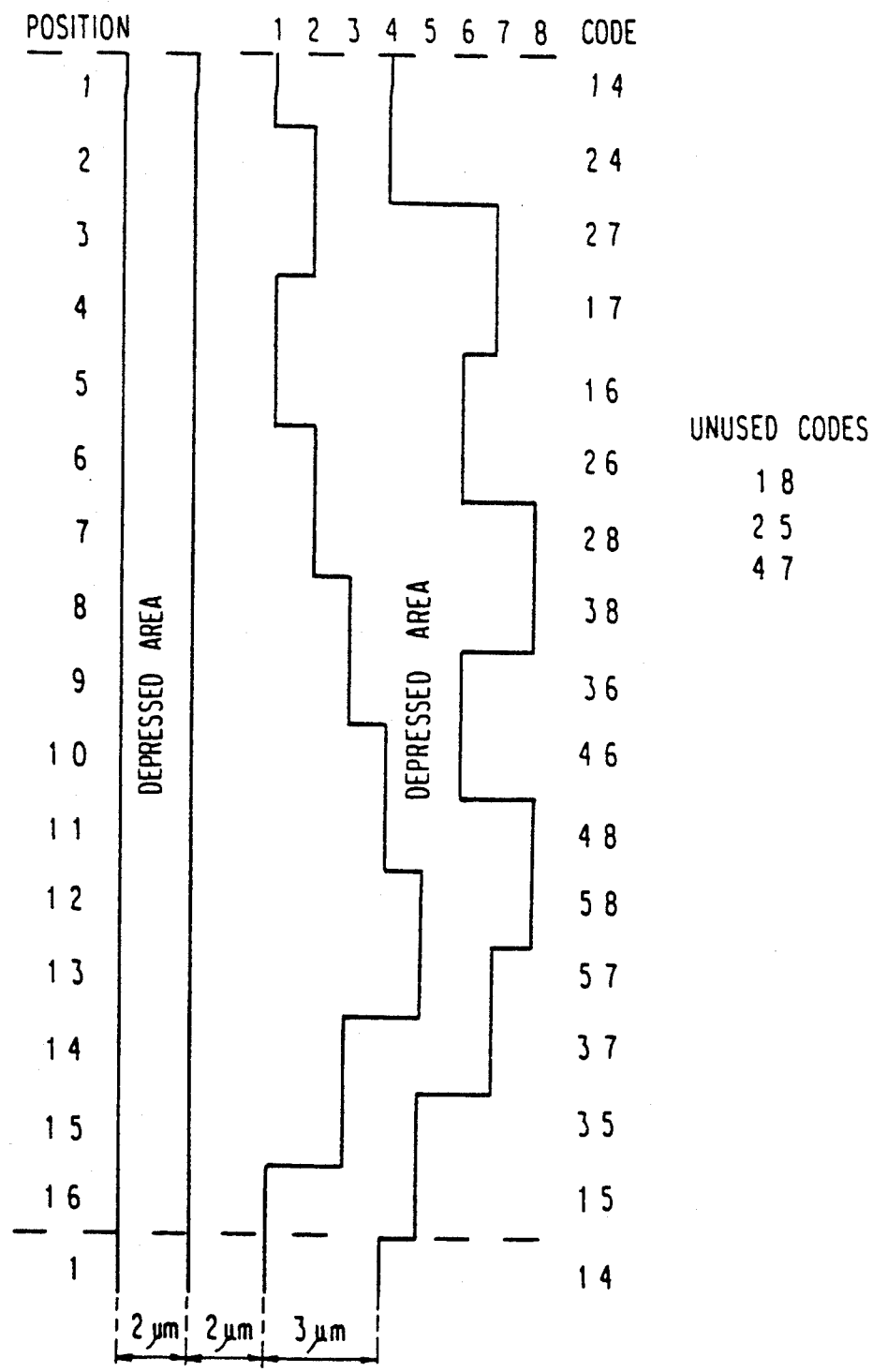
FIG. 35 is a fourth set length sixteen code pattern of two edges and eight positions.

The set of code combinations of FIG. 32, omitting the pairs 1-5, 2-7 and 4-8, is not the only satisfactory set. A study of the code combinations shows that there are three other groups of three code combinations each of which can be left unused and a sixteen-length code can still be obtained. FIG. 33 shows one of the code arrangements that is possible when omitting the pairs 1-5, 2-8 and 4-7. There are again many possible reorderings of that set of codes. FIG. 34 shows one of the code arrangements possible when omitting the pairs 1-7, 2-5 and 4-8. FIG. 35 shows one of those possible when omitting the pairs 1-8, 2-5 and 4-7. Many reorderings of these combinations are also possible. However, no other sets of code groups can be used to obtain a sixteen-length sequence that does not violate the constraints, and no sequence longer than sixteen is possible. Any possible sixteen-length code must use one of the sets of combinations shown in FIGS. 32 to 35, although many different reorderings are possible. These codes are clearly superior to that in FIG. 31 as they obtain a code length of sixteen with a width of only 11 μm and have no ambiguity problems.

Figure 36:
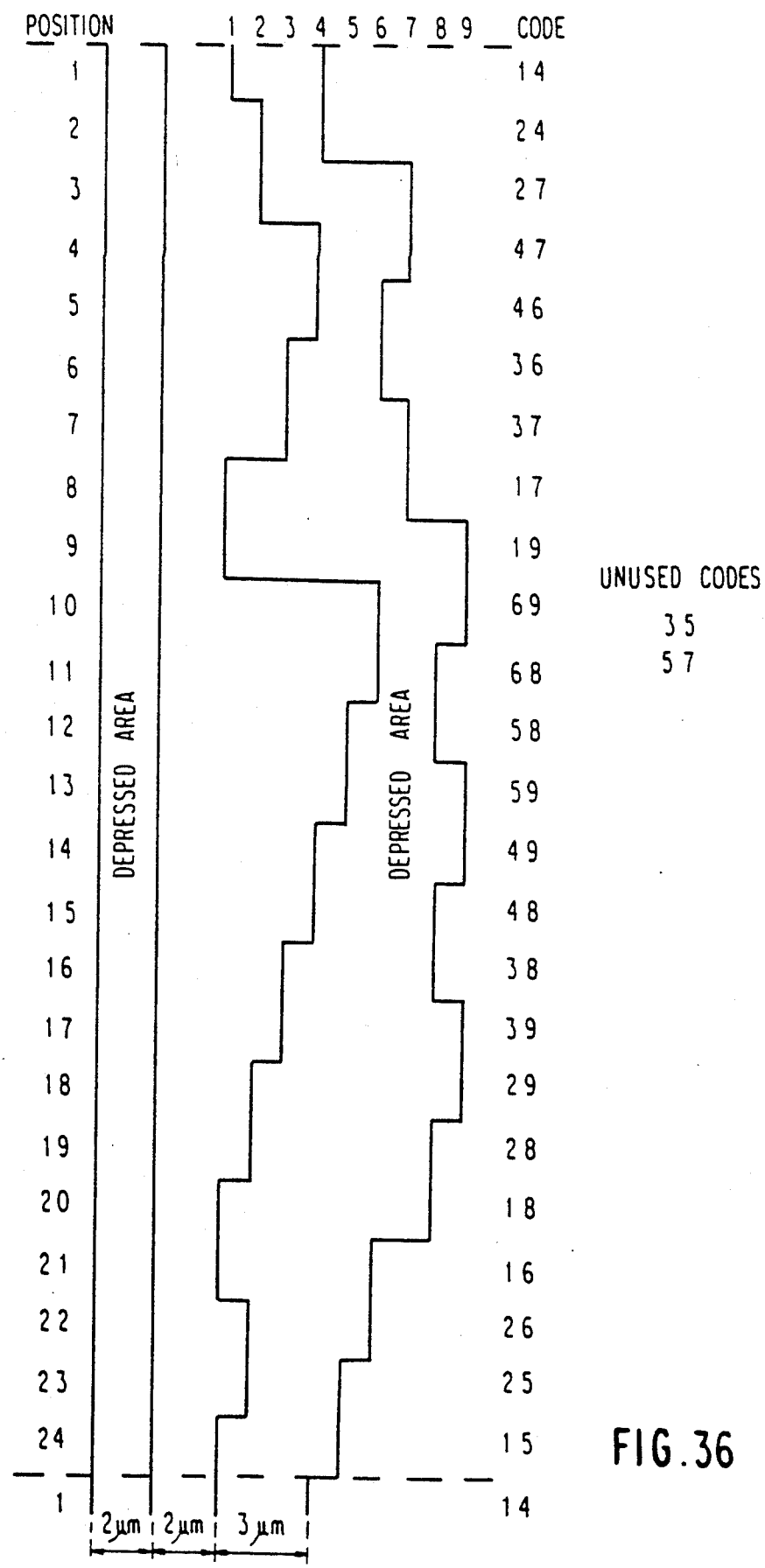
FIG. 36 is a twenty-four length code pattern of two edges and nine positions.

A sixteen-length code is probably adequate as it will be multiplied by the length of the tracking code, probably three or four, to obtain the total resolving power of the combination. Thus, it will resolve the track location to within 48 to 64 tracks, depending on the tracking code period. If more resolution is needed, the above codes could be extended by increasing the number of possible positions by one, which would increase the width to 12 μm and the code length to a maximum of twenty-four positions. FIG. 36 shows one of the possible arrangements that yield the 24-length maximum. There are only two unused code combinations; the pairs 3-5 and 5-7. Study of the combinations shows that this is the only code set that is capable of reaching the 24-length maximum limit. Of course, any of the maximal length codes can be arbitrarily shortened by deleting one or more code points, as desired.

Figure 37:
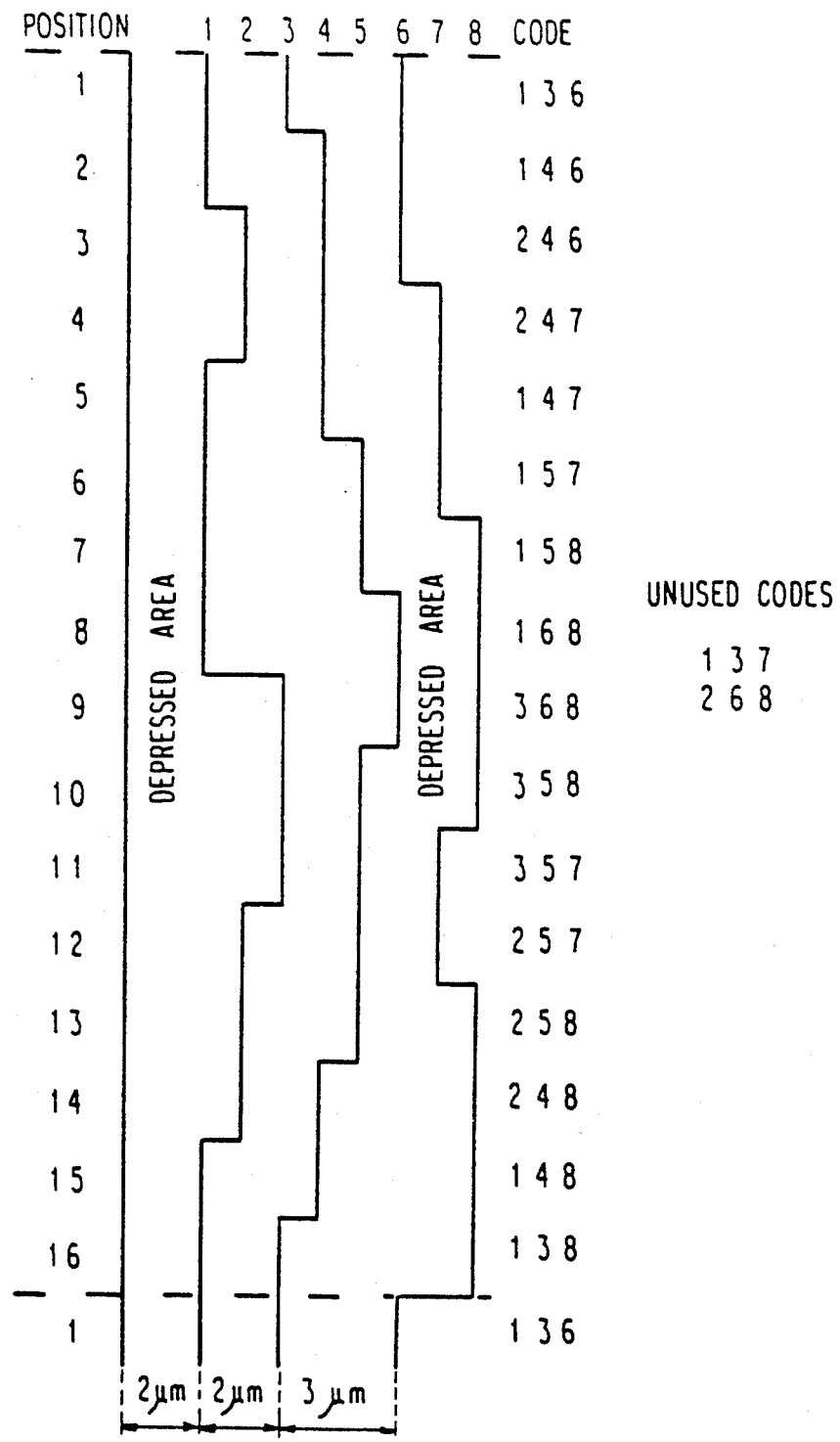
FIG. 37 is a first set length sixteen code pattern of three edges and eight positions.
Figure 38:
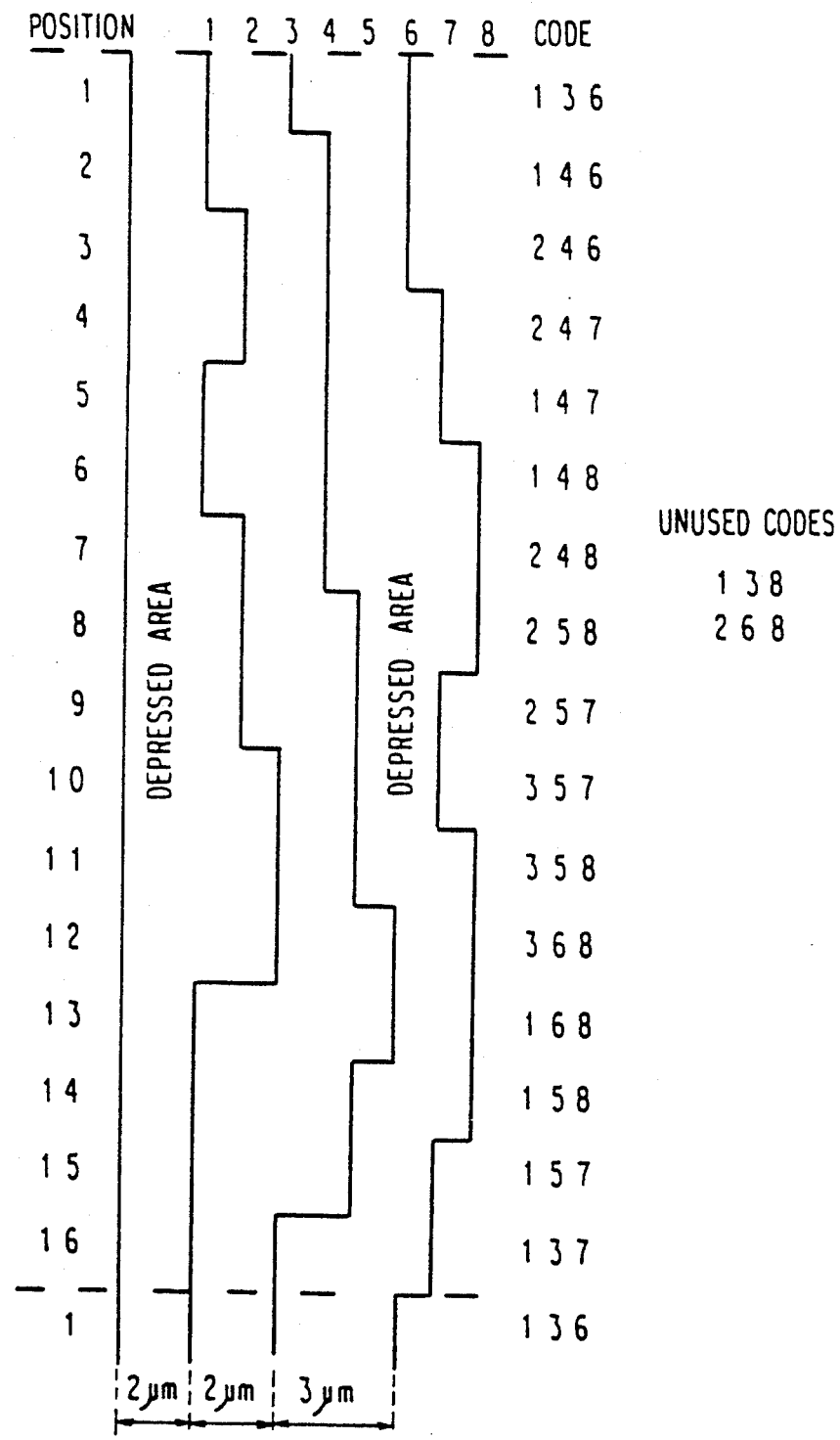
FIG. 38 is a second set length sixteen code pattern of three edges and eight positions.
Figure 39:
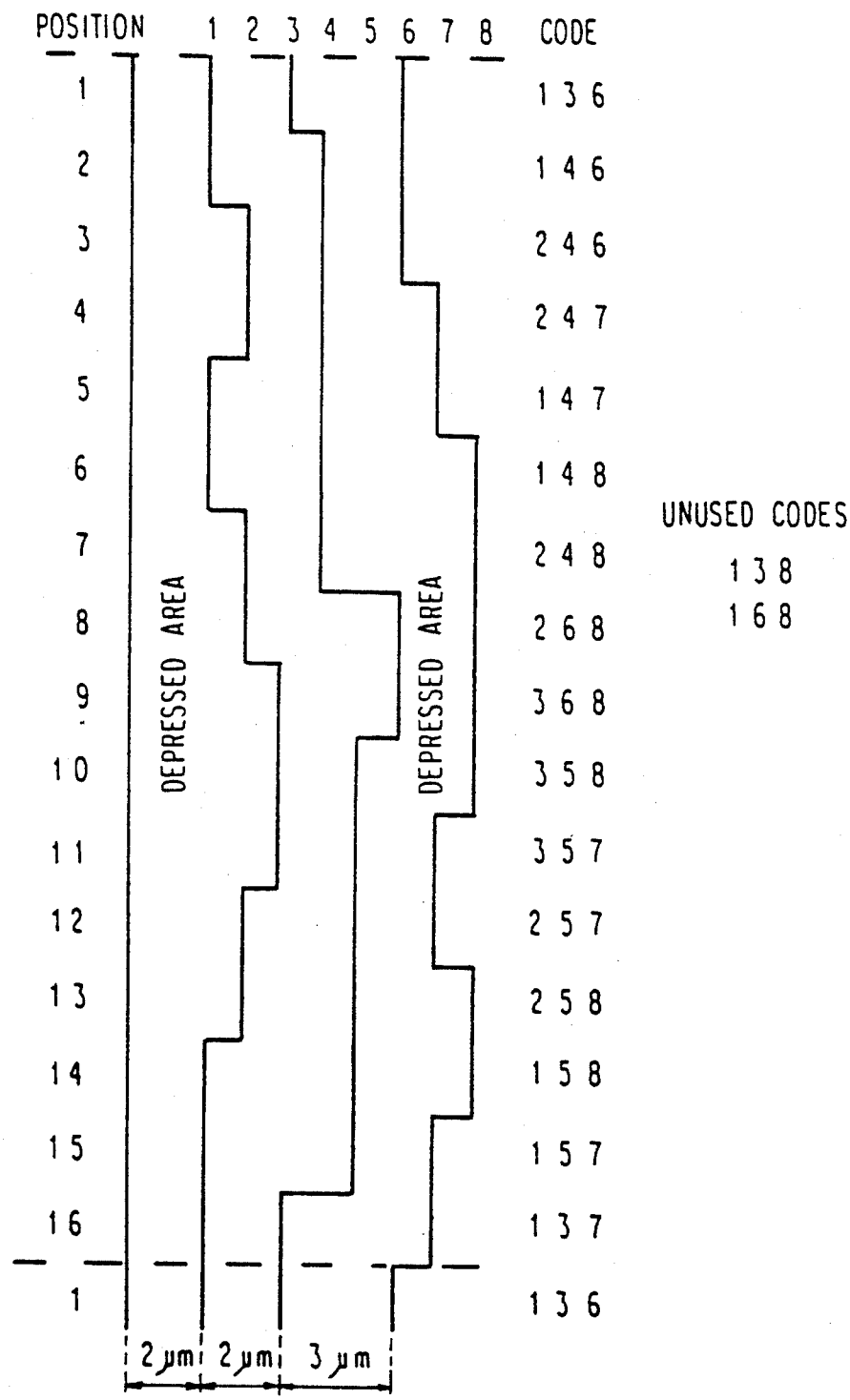
FIG. 39 is a third set length sixteen code pattern of three edges and eight positions.
Figure 40:
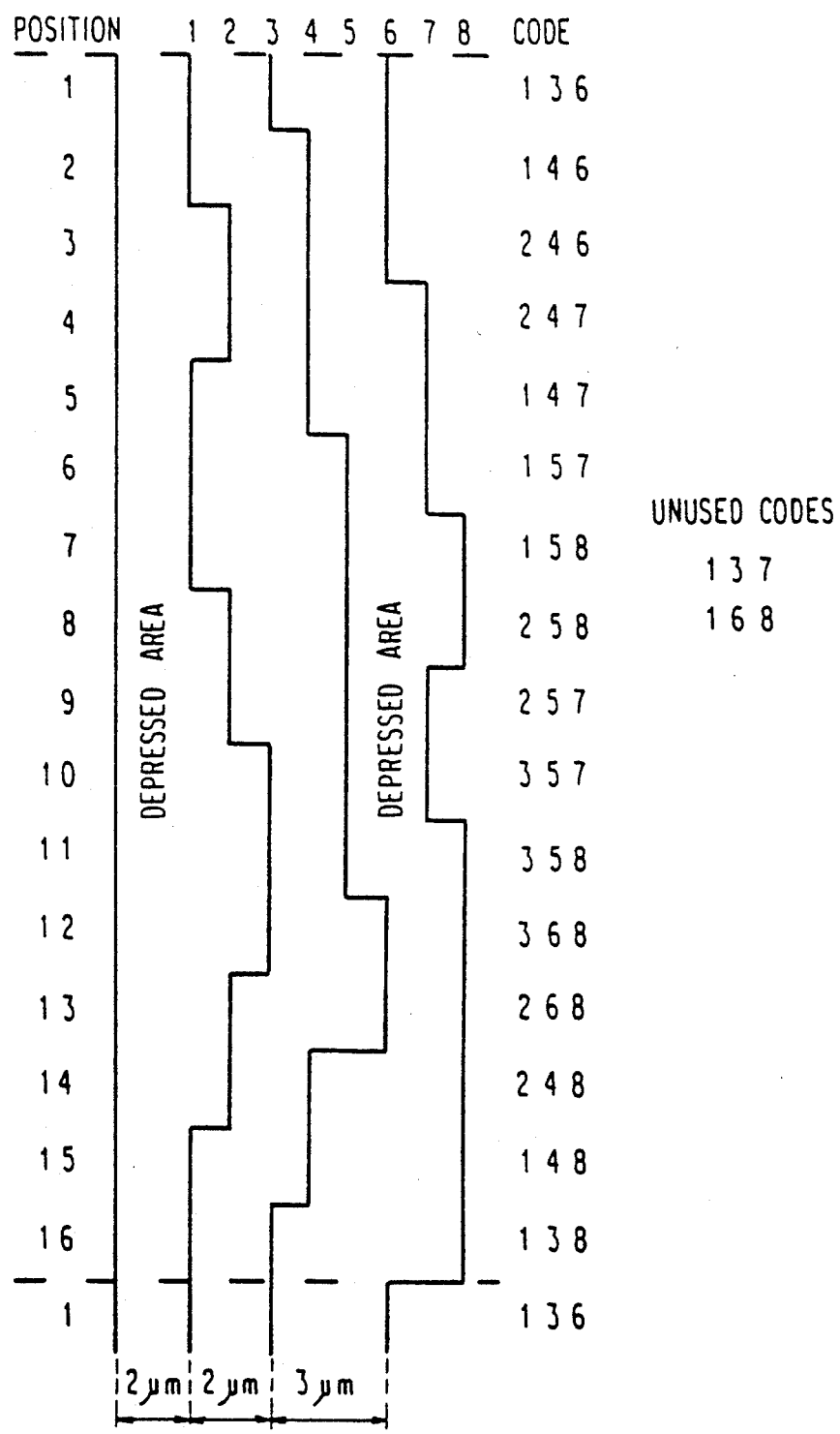
FIG. 40 is a fourth set length sixteen code pattern of three edges and eights positions.

Greater efficiency can be obtained by allowing three of the four edges to be variable, as shown in FIG. 37, which achieves the maximum code length of sixteen with a total width of only 9 μm, a saving of 2 μm per sector. (These are nominal values for the sample illustration, and the actual saving depends on the exact widths and step sizes used.) There are 56 possible combinations of eight positions taken three at a time. However, most of these are unusable because they violate the requirement of minimum widths and minimum spacings of two units (micrometers in the examples given). Eighteen combinations are left that are usable with these constraints. Four code arrangements achieve a length eighteen, but they all have an ambiguity problem caused by having two adjacent steps in the same edge, as occurred in FIG. 31. To avoid adjacent steps, two of the code combinations must be left unused. FIG. 37 shows the pattern with the triplets 1-3-7 and 2-6-8 omitted. FIG. 38 shows the pattern with the triplets 1-3-8 and 2-6-8 omitted. FIG. 39 shows the pattern with the triplets 1-3-8 and 1-6-8 omitted. FIG. 40 shows the pattern with the triplets 1-3-7 and 1-6-8 omitted. Thus, one of the pair 1-3-7 and 1-3-8 must be omitted, and one of the pair 1-6-8 and 2-6-8 must be omitted. As in the two edge case shown in FIGS. 32 and 35, there are only four sets of code combinations that can be used to obtain the maximum length of sixteen with three edges and eight positions usable. The greater efficiency of these three-edge codes makes them highly desirable.

Figure 41:
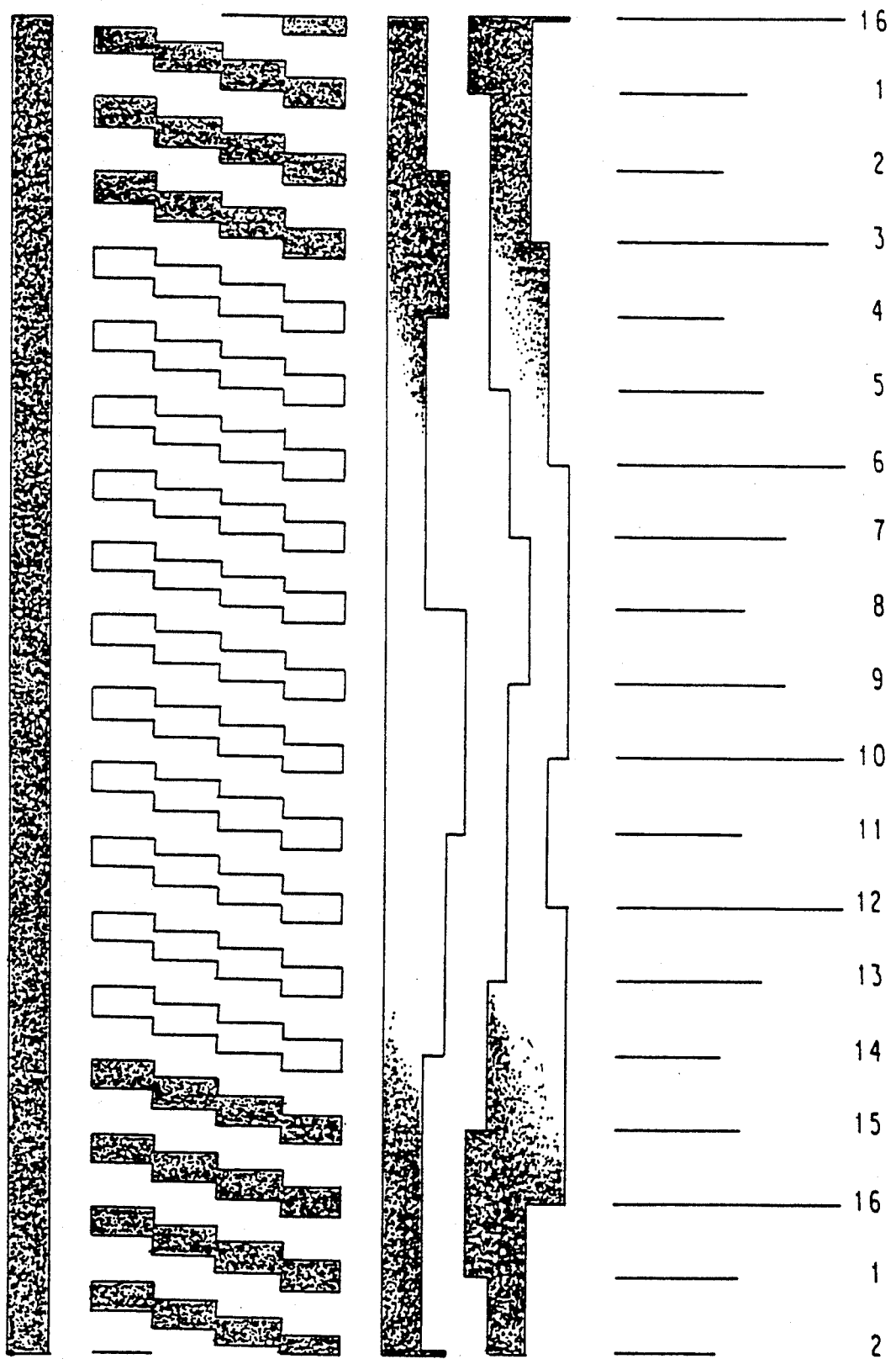
FIG. 41 is a sixteen-position gray code with a four-phase tracking code.

As stated before, a sixteen-length code is probably adequate as it provides resolution to 48 or 64 tracks, depending on the tracking code period. If greater resolution is needed, the width of the two-stripe, three-edge codes can be expanded by one. The theoretical length of the nine-position, width 10 μm code is thirty-two, but the adjacent step problem constrains it to smaller code lengths. Similarly, the three-edge code can be contracted to an 8 μm width with seven positions, but the code length is only seven, not a convenient or practical number. The three-edge, eight-position code, with a 9 μm width and length of 16, as shown in FIGS. 38 to 40, is probably the best choice. FIG. 41 shows the code of FIG. 37 in conjunction with a four-row, four-phase tracking code. Note that the gray code changes once for each period of the tracking code and that the change points are adjusted so that each group of four tracks falls centered within one gray code interval.

The invention provides sector-servo tracking and gray code patterns having large feature sizes and spacings which can be readily achieved by photolithographic processes and offer potential for greatly increased track densities as shorter laser wavelengths become available. These patterns are insensitive to variations in the spot size and in the feature sizes and spacings They have no ambiguities as to track position or direction of head motion during seek operations. They are also highly efficient in terms of the disk space used. The elimination of noise from groove structures will probably allow an increase in densities sufficient to recapture the loss caused by insertion of the sector-servo patterns The improved reliability of seek operations and track acquisition and insensitivity to defects are significant advantages.

The track-following-servo patterns use three or four rows of features with lengths and spacings greater than the track pitch, arranged in a three or four-phase system. This is much more efficient than using two, two-phase systems arranged in quadrature, and allows larger features. By balancing opposing edges, independence of the track center servo gain, with variations of feature size, are obtained either by using the small inside pair of edges against the opposing variations of an outside pair of edges. Redundant TES produce reduced tracking errors in the presence of media defects. Spot location within the servo period can always be found without ambiguity and with no ambiguity as to relative head-disk motion direction during track acquisition.

The gray codes use edges that have no interruptions from inner or outer diameter, thus avoiding resolution problems and reliability problems related to detecting the presence or absence of marks with media defects. One or more straight edges provide timing reference, and two or more edges have discrete position locations in accordance with gray codes that allow a maximum efficiency in span of track location capability for the number of positions used and the width of the inserted features For certain desirable classes of codes, all possible arrangements that achieve maximum code length are identified.

While the invention has been described in terms of several preferred embodiments, those skilled in the art will recognize that the invention can be practiced with modification within the spirit and scope of the appended claims.

What is claimed is:

1. An optical disk for storing data comprising:
   a substrate and an optical recording layer on said substrate, said recording layer defining a plane and having a plurality of concentric recording tracks subdivided into a plurality of servo sectors and data sectors;
   said servo sectors having a servo pattern characterized by an arrangement of features having predetermined sizes and shapes in several radial rows so that a track error signal can be found by comparing multi-phase signals proportional to distances between edges of features in one row and proportional to distances between edges of features in some other row, the servo pattern being composed of a plurality of rows of said features in the form of depressions in or raised areas on the plane of said recording layer; and
   said features having lengths within a radial direction of a row and being separated by spaces along said radial direction greater than a width of said recording tracks.

2. The optical disk recited in claim 1 wherein the number of phases of said servo pattern is three or more phases.

3. The optical disk recited in claim 1 wherein the number of rows of said areas composing said servo pattern is three or more.

4. The optical disk recited in claim 1 wherein the number of phases of said servo pattern is three composed of three rows of said areas.

5. The optical disk recited in claim 1 wherein the number of phases of said servo pattern is four composed of three rows of said areas.

6. The optical disk recited in claim 1 wherein the number of phases of said servo pattern is four composed of four rows of said areas.

7. The optical disk recited in claim 6 wherein edge separations between said areas are just greater than a reading laser spot size and reflectance values from all four rows are summed to form a track error signal whose slope, and resultant servo gain, is unaffected by variations in spot size, area lengths and track offset position.

8. The optical disk recited in claim 6 wherein the four phase pattern generates redundant track error signals whereby defects in a servo sector area can be compensated or bypassed to avoid tracking errors.

9. The optical disk recited in claim 1 wherein said servo pattern has a pattern period, within a row, of three or more times the track width.

10. The optical disk recited in claim 1 wherein edge separations between said areas are just greater than a reading laser spot size whereby a variation of track error signal slope with spot size or area length is minimized.

11. The optical disk recited in claim 1 further comprising within said servo sectors a digital gray code formed of rows of areas in a plane different than the plane of said layer and extending, without interruption, from an inner diameter to an outer diameter of said disk.

12. The optical disk recited in claim 11 wherein said gray code defines groups of tracks and said servo pattern is decoded to identify a specific track within a group thereby minimizing the number of rows of said areas used for said gray code.

13. The optical disk recited in claim 11 wherein said code comprises at least one straight edge and two or more edges that are located at designated positions according to the gray code such that the minimum stripe width and spacing are an integer multiple of the spacing between adjacent designated edge positions of the code.

14. The optical disk recited in claim 11 wherein said code has a length of sixteen with two variable edges that can occupy eight positions.

15. The optical disk recited in claim 11 wherein said code has a length of sixteen with three variable edges that can occupy eight positions.

16. The optical disk recited in claim 1 wherein said areas are depressions in said layer.

17. The optical disk recited in claim 1 wherein said areas are mounds on said layer.

18. The optical disk recited in claim 1 wherein said servo pattern is formed using a photolithographic process.

19. An optical data storage system comprising:
an optical disk for storing data;
an optical head assembly radially movable adjacent a recording surface of aid optical disk for detecting concentric recording tracks on said optical disk;
address register means for temporarily storing an address of one of said recording tracks;
first servo means responsive to said address for radially moving said optical head assembly to seek an addressed recording track;
second servo means responsive to said address for radially moving said optical head assembly to follow the addressed recording track after said first servo means positions said optical head assembly over the addressed recording track;
said optical disk comprising a substrate and an optical recording layer on said substrate, said recording layer defining a plane and having a plurality of concentric recording tracks subdivided into a plurality of servo sectors and data sectors;
said servo sectors having a servo pattern characterized by an arrangement of features having predetermined sizes and shapes in several radial rows so that a track error signal can be generated by said second servo means by comparing multi-phase signals proportional to distances between edges of features in one row and proportional to distances between edges of features in some other row, the servo pattern being composed of a plurality of rows of said features in the form of depressions in or raised areas on the plane of said recording layer; and
said features having lengths within a radial direction of a row and being separated by spaces along said radial direction greater than a width of said recording tracks.

20. The optical data storage system as recited in claim 19 wherein the number of phases of said servo pattern on said optical disk is three or more phases.

21. The optical data storage system as recited in claim 19 wherein the number of rows of said areas composing said servo pattern on said optical disk is three or more.

22. The optical data storage system as recited in claim 19, wherein the number of phases of said servo pattern on said optical disk is three composed of three rows of said areas.

23. The optical data storage system as recited in claim 19 wherein the number of phases of said servo pattern on said optical disk is four composed of three rows of said areas.

24. The optical data storage system as recited in claim 19 wherein the number of phases of said servo pattern on said optical disk is four composed of four rows of said areas.

25. The optical data storage system as recited in claim 19 wherein said servo pattern on said optical disk has a pattern period, within a row, of three or more times the track width.

26. The optical data storage system as recited in claim 19 wherein edge separations between said areas on said optical disk are just greater than a reading laser spot size whereby a variation of track error signal slope with spot size or area length is minimized.

27. The optical data storage system as recited in claim 19 further comprising within said servo sectors on said optical disk a digital gray code formed of rows of areas in a plane different from the plane of said layer and extending, without interruption, from an inner diameter to an outer diameter of said disk.

28. The optical data storage system as recited in claim 19 wherein said areas are depressions in said layer.

29. The optical data storage system as recited in claim 19 wherein aid areas are mounds on said layer.

30. The optical disk storage system as recited in claim 19 wherein said servo pattern on said optical disk is formed using a photolithographic process.

* * * * *